United States Patent [19]

Damouny et al.

[11] Patent Number: 4,573,118
[45] Date of Patent: Feb. 25, 1986

[54] MICROPROCESSOR WITH BRANCH CONTROL

[75] Inventors: Nabil G. Damouny, Sunnyvale; Min-Siu Huang, Mountain View, both of Calif.

[73] Assignee: Fairchild Camera & Instrument Corporation, Mountain View, Calif.

[21] Appl. No.: 481,061

[22] Filed: Mar. 31, 1983

[51] Int. Cl.[4] .................................................. G06F 9/00
[52] U.S. Cl. ..................................................... 364/200
[58] Field of Search .......................... 364/200 MS File

[56] References Cited

U.S. PATENT DOCUMENTS 3,943,495 3/1976 Garlic ..................................... 364/200

Primary Examiner—Raulfe B. Zache
Attorney, Agent, or Firm—Clifton L. Anderson; Carl L. Silverman; Dave Carroll

[57] ABSTRACT

A microprocessor data processing system (1700) includes system units (50, 1704) connected to a bus (1702), with a bus arbiter (1712) and a protocol for assigning bus access to the system units (50, 1704). The microprocessor (50) executes both arithmetic operations and floating point operations. A microcontrol store (162) stores common instructions usable in different floating point operations. A PLA (180) supplies addresses to microcontrol store (162) and provides a signal indicating floating point instruction type. The microprocessor (50) includes a pending interrupt register (250) connected to mask and enable logic (268). The mask and enable logic (268) is connected to a priority encoder (278), which is connected to an interrupt latch (282). The latch (282) supplies outputs to generate a current state storage address. Branch control logic (1938) receives branch conditions inputs and branch control information and generates control signals for a next micro address multiplexer (1934) in a pipelined instruction path.

10 Claims, 25 Drawing Figures

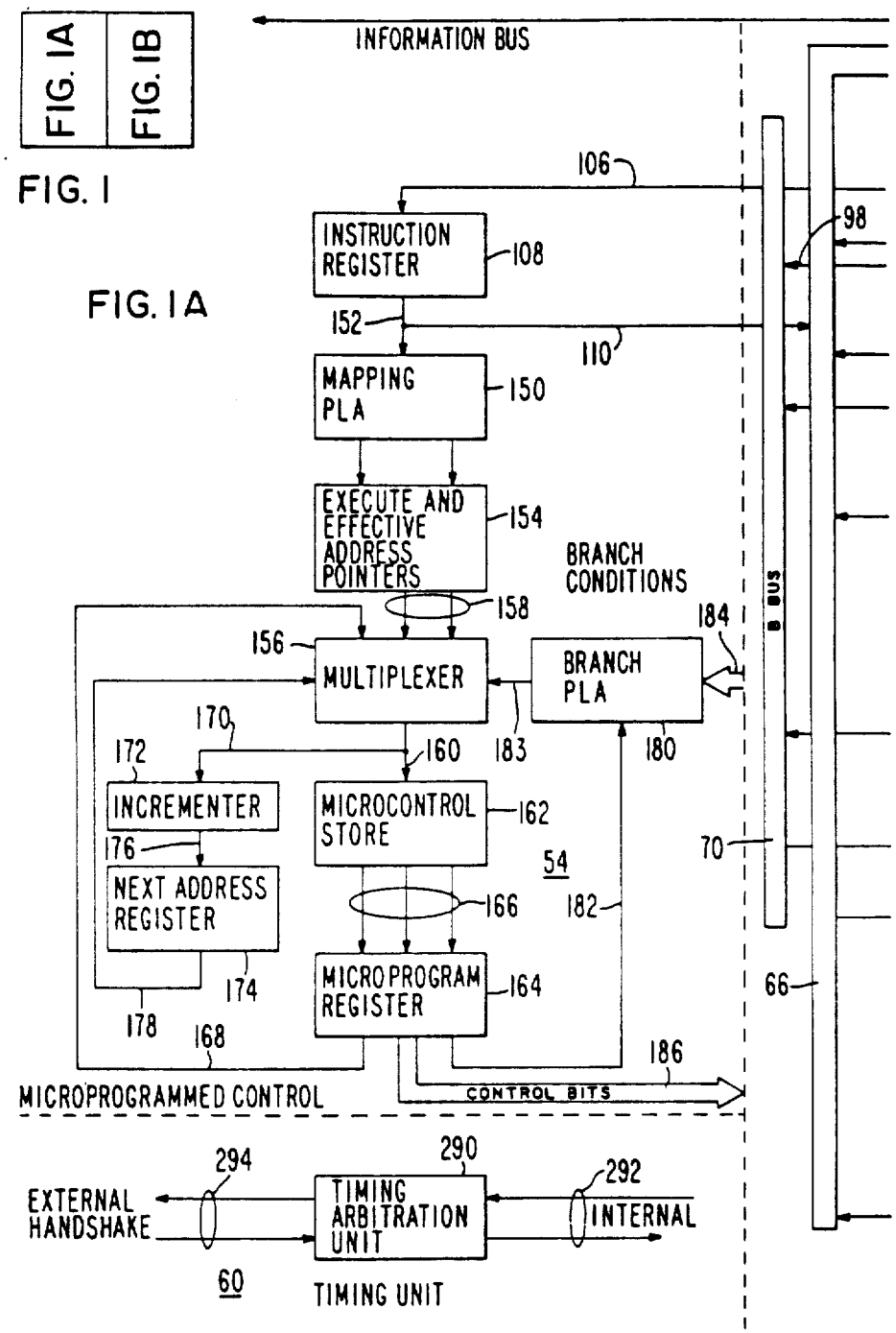

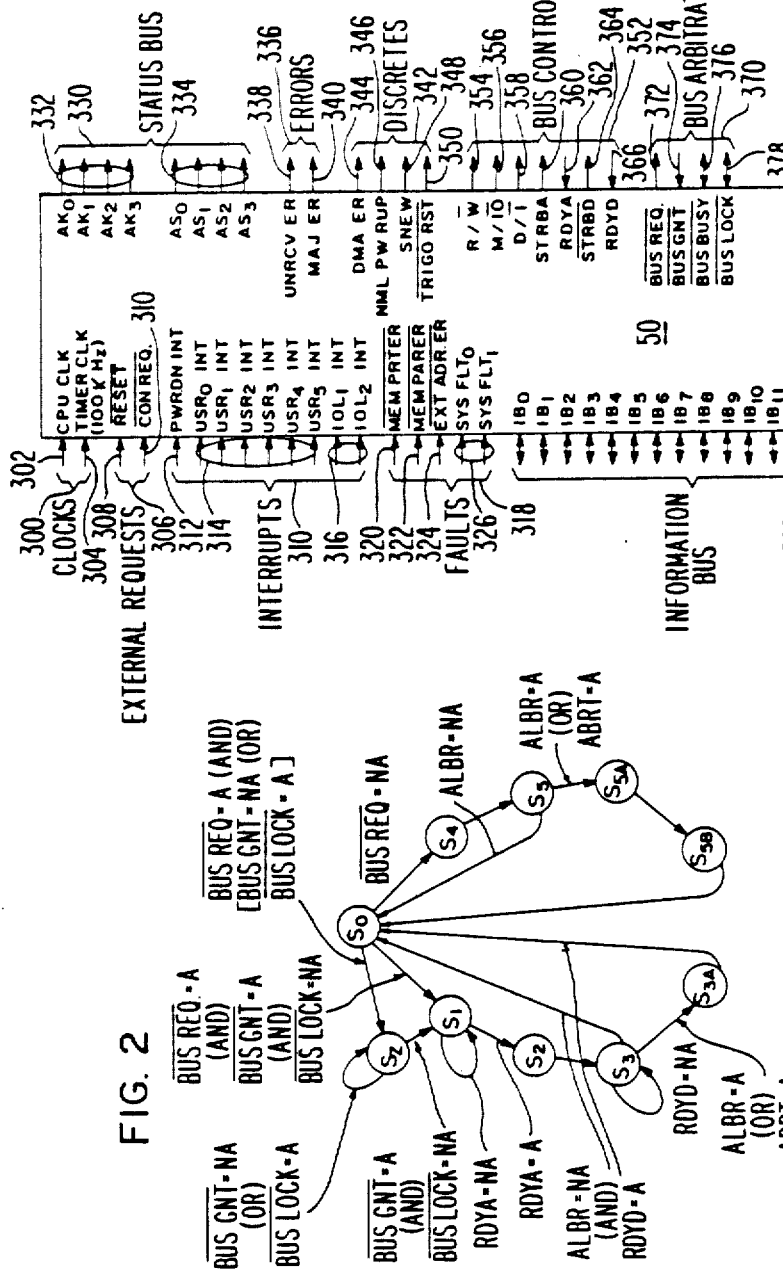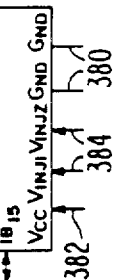
FIG. 2
FIG. 3

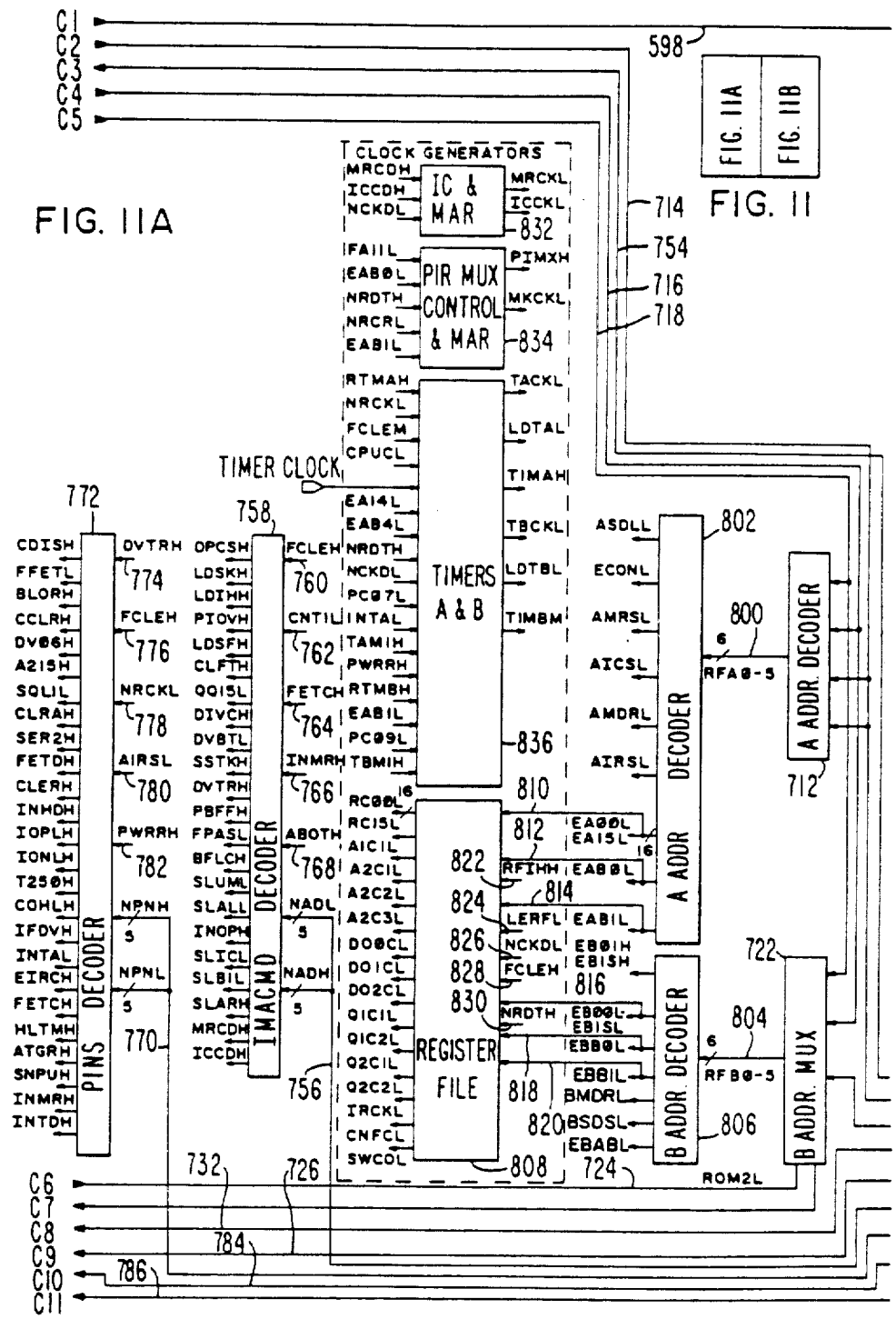

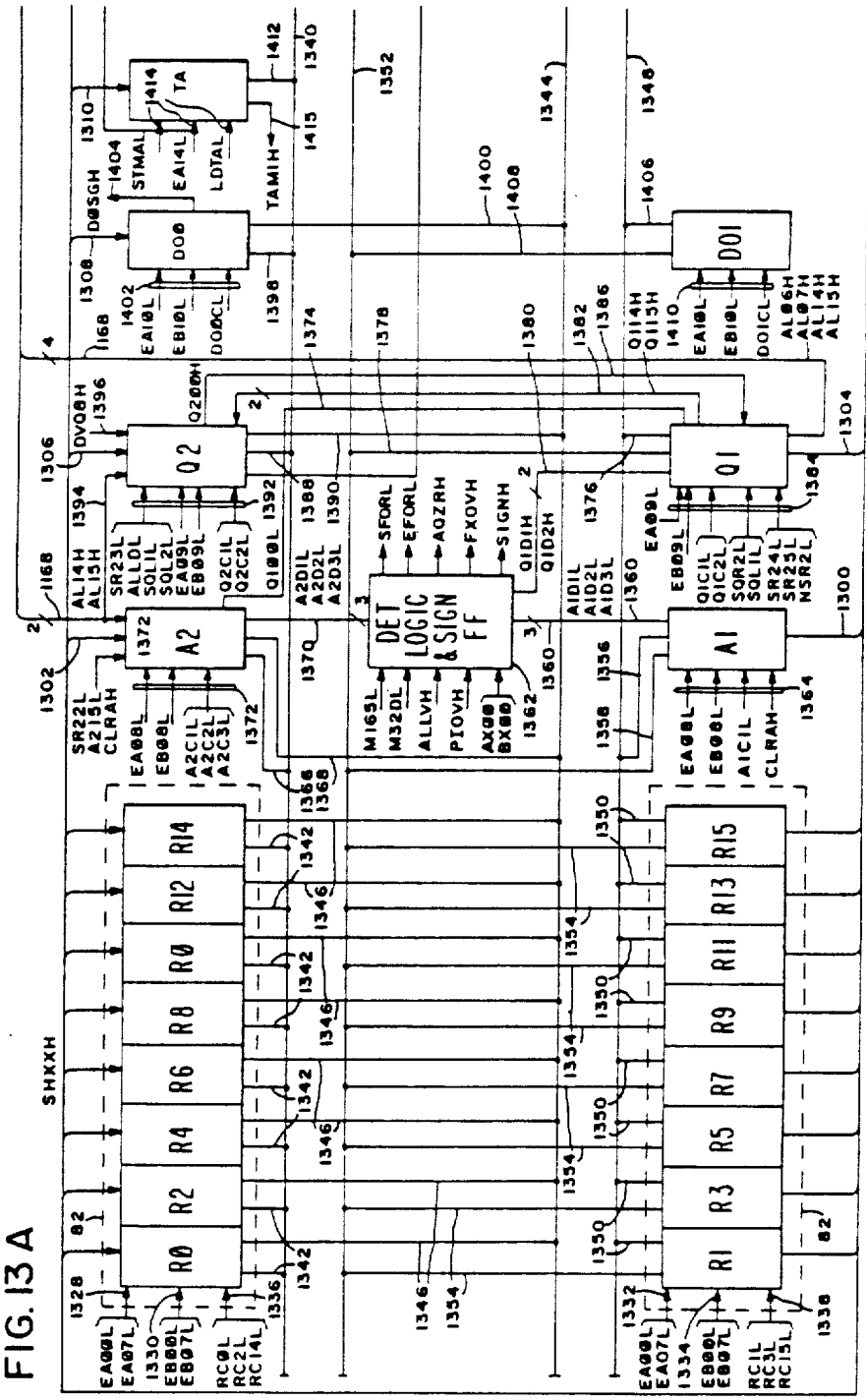

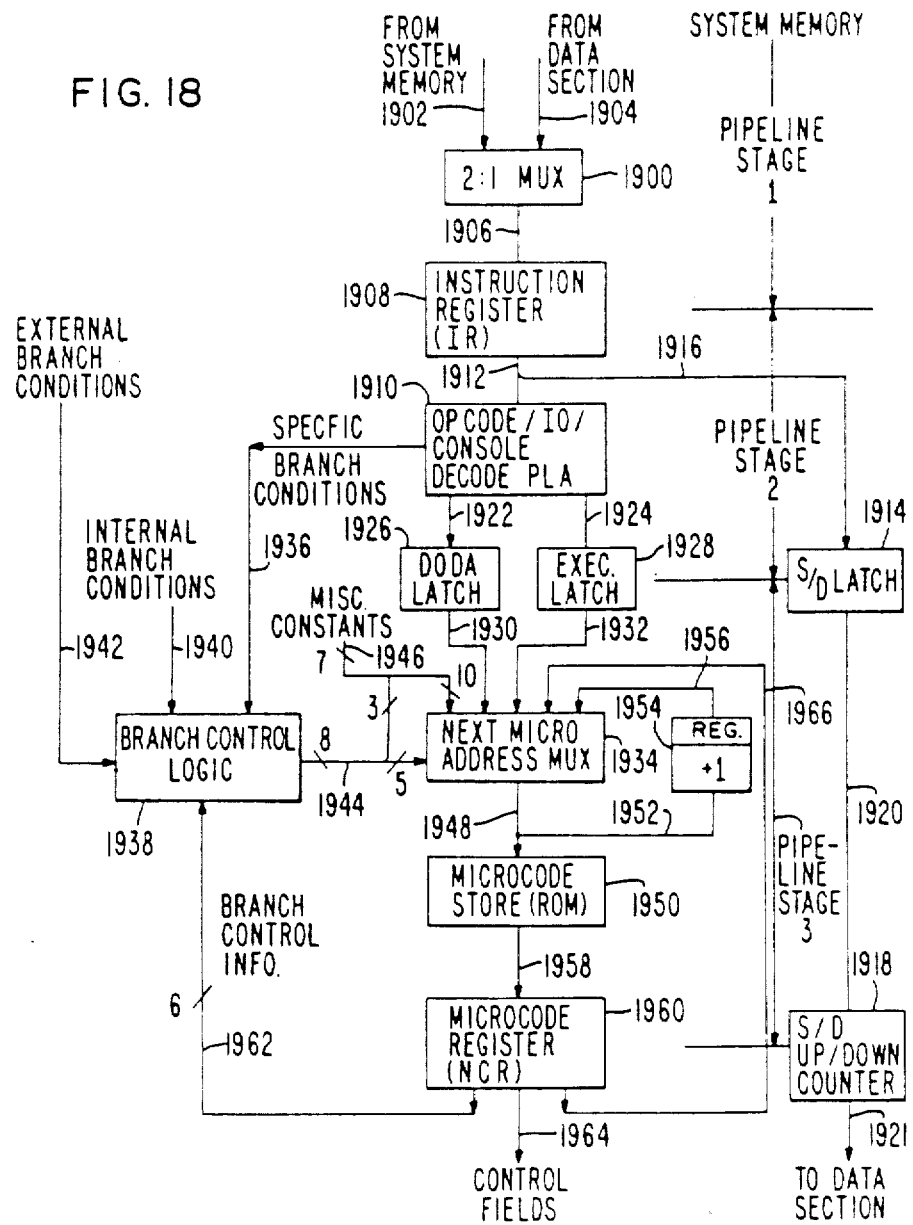

MICROPROCESSOR WITH BRANCH CONTROL

CROSS-REFERENCE TO RELATED APPLICATIONS

This application and the following concurrently filed applications contain claims to related subject matter:

Nabil Damouny, Yeshayahu Mor, Henry C. Lynn, Jr., "Microprocessor Multiprocessing System" Ser. No. 481,059;

Dan Wilnai, Yeshayahu Mor, "Arithmetic and Floating Point Microprocessor" Ser. No. 481,060;

Yeshayahu Mor, Michael G. Mladejovsky, "Microprocessor Interrupt System" Ser. No. 481,062.

This application and the following earlier filed applications also contain claims to related subject matter:

Yeshayahu Mor, Yeffi Pilzer, "Code Shared Microprocessor", application Ser. No. 468,511.

Yeshayahu Mor, "Modified Booth Algorithm Microprocessor", application Ser. No. 468,450.

Michael G. Mladejovsky, "Constants Generation Microprocessor", application Ser. No. 468,449.

Nabil Damouny, "Microprocessor with Dynamically Reconfigurable Pipeline", application Ser. No. 468,448.

Yeshayahu Mor, Nabil Damouny, Min-Siu Huang, "Pipelined Microprocessor with Instruction Restart", application Ser. No. 468,445.

Nabil Damouny, Min-Siu Huang, Yeshayahu Mor, Dan Wilnai, "Microprocessor with Compact Mapped Programmable Logic Array", application Ser. No. 468,512.

This application covers improvements in certain of the concepts disclosed in commonly assigned prior applications Ser. Nos. 06/155,832, filed May 30, 1980 in the name of Yeshayahu Mor and Dan Wilnai and entitled "High Performance Microprocessor System"; 06/155,831, filed May 30, 1980 in the name of Yeshayahu Mor and entitled "Microprocessor with Improved Registers and Arithmetic Logic Unit Data Path"; 06/155,151, filed May 30, 1980 in the names of Yeshayahu Mor and Allan M. Schiffman and entitled "Microprocessor with Improved Arithmetic Logic Unit Data Path"; 06/155,141, filed May 30, 1980 in the names of Allan M. Schiffman, Yeshayahu Mor and Gary R. Burke and entitled "Microprocessor with Data and Program Protection"; and 06/155,152, filed May 30, 1980 in the name of Gary R. Burke and entitled "Microprocessor with Improved Information Bus Utilization". It further relates to inventions described in commonly assigned applications Ser. No. 06/167,614, filed July 11, 1980 in the name of Hemraj K. Hingarh, and entitled "Combined Integrated Injection Logic and Transistor-Transistor Logic Microprocessor Integrated Circuit Design"; and Ser. No. 06/167,607, filed July 11, 1980 in the name of Michael G. Mladejovsky and entitled "Cycle Counter for Microprocessor Integrated Circuit."

This application also covers improvements in certain of the concepts disclosed in commonly assigned prior applications Ser. Nos. 06/433,068, filed Oct. 6, 1982 in the names of Melesse Ayalew, et al and entitled "Floating Point Microprocessor with Programmable Shifter"; 06/432,625, filed Oct. 4, 1982 in the names of Gary R. Burke et al and entitled "Floating Point Microprocessor with Off Chip Microinstructions"; 06/433,063, filed Oct. 6, 1982 in the names of Gary R. Burke et al and entitled "Floating Point Microprocessor with Directable Two-Level Microinstructions"; 06/433,056, filed in the names of Gary R. Burke et al and entitled "Floating Point Microprocessor with Instruction Decoding"; 06/433,059, filed Oct. 6, 1982 in the names of Gary R. Burke et al and entitled "Floating Point Microprocessor with External Microcode and Operands"; 06/433,060, filed Oct. 6, 1982 in the names of Yeshayahu Mor et al and entitled "Floating Point Microprocessor with Number Alignment"; and 06/432,498, filed Oct. 4, 1982 in the names of Tich T. Dao et al and entitled "Floating Point Microprocessor System."

BACKGROUND OF THE INVENTION

This application relates to an improved architecture for a high performance microprocessor integrated circuit. More particularly, it relates to such a microprocessor system architecture which allows computed results to be fed back in real time to other parts of embedded computer systems. Most especially, this invention relates to such a microprocessor system architecture which allows the provision of a single chip very large scale integration (VLSI) 16-bit bipolar microprocessor with floating point as well as fixed point arithmetic and extensive real time processing capabilities.

Commercially available microprocessor integrated circuits, such as an F9445 microprocessor integrated circuit, obtainable from Fairchild Camera & Instrument Corporation, Mountain View, Calif.; an Intel 8080, 8088, or 8087, obtainable from Intel Corporation, Santa Clara, Calif.; a Motorola 6800 or 68000, obtainable from Motorola, Inc., Phoenix, Ariz.; or a National Semiconductor 16000, obtainable from National Semiconductor Corporation, Santa Clara, Calif., all employ a series of elemental instructions called microcode for causing the microprocessors to carry out operations on data supplied to them. The microcode is typically stored in a read only memory (ROM), or a programmable logic array (PLA) structure forming a part of the microprocessor integrated circuit.

Since the first microprocessor was introduced, microprocessor integrated circuits have markedly increased both in the complexity and number of microinstructions that may be carried out, and in the number of circuit elements that can be incorporated in a single integrated circuit, with improvements in integrated circuit design and fabrication technology.

However, as the capabilities of microprocessors increase, users and potential users of microprocessors continually devise more sophisticated and demanding desired performance characteristics in a microprocessor. For example, embedded computer systems, such as automatic flight controllers, inertial navigation systems or industrial controllers require high precision computation done on rapidly changing "real life" variables. In such systems, the computed results have to be fed back in real time, i.e., within micro or milliseconds, to other parts of the systems to close the appropriate control loop. In particular, the instruction set architecture specified by MIL-STD-1750A (Notice 1) requires considerable improvement in microprocessor design for implementation. MIL-STD-1750A is of particular relevance for flight control systems, but similar demands are made by other real time processing environments, such as in data collection systems for nuclear physics experiments, radar data interpretation systems, rapid transit vehicle control, and even certain "on line" business applications. Such real time processing environments, for example, require high throughput and precision so that the results of data processing are available in time and in an accurate form to influence the process or system being monitored or controlled. In summary, such systems require a high performance microprocessor with both accurate floating point and fixed point arithmetic, and comprehensive interrupt and fault handling.

SUMMARY OF THE INVENTION

Accordingly, it is an object of this invention to provide a high performance microprocessor with the ability to handle both accurate floating point and fixed point arithmetic in a rapid manner.

It is another object of the invention to provide such a microprocessor with the ability to handle interrupts and faults in a comprehensive manner.

It is another object of the invention to provide such a microprocessor incorporating a high level of pipelining and concurrency of operation.

It is still another object of the invention to provide such a microprocessor which utilizes fast algorithms for extremely rapid execution times of arithmetic operations.

It is a further object of this invention to provide a multiprocessing system which utilizes a handshaking protocol which is flexible enough to handle both synchronous and asynchronous operation.

It is a still further object of the invention to provide such a system which incorporates processors and direct memory access units.

It is yet another object of the invention to provide such a system in which control switching time from one master processor to another master processor is reduced.

It is still another object of the invention to provide a microprocessor which carries out arithmetic operations and floating point operations using the same type of microcode.

It is a further object of the invention to provide a microprocessor in which common microcode instructions are used for carrying out different floating point operations in an efficient manner.

It is another object of the invention to eliminate the need for a dedicated pinout of a microprocessor for an interrupt acknowledge signal.

It is a still further object of the invention to generate interrupt linkage pointers in a microprocessor more efficiently.

It is yet another object of the invention to provide an efficient interrupt vectoring sequence in a microprocessor.

It is still another object of the invention to provide control needed to sequence through microcode, taking into account commands from a current microcode word, internal branch conditions and external branch conditions.

It is a further object of the invention to provide such control which takes into account commands from a decoding programmable logic array.

It is yet another object of the invention to provide such a control which synchronizes external events with the internal operation of the microprocessor.

It is a still further object of the invention to provide such a control which increases performance level in a pipelined microprocessor.

The attainment of these and related objects may be achieved through use of the novel microprocessor herein disclosed. In accordance with one aspect of this invention, a microprocessor data processing system includes a plurality of system units connected in parallel to a common bus. A memory is connected to the common bus for access by the system units. A bus arbiter is connected to each of the system units to provide a bus grant signal to a selected one of the system units. Each system unit includes means for supplying a bus request signal to the bus request signal to the bus arbiter, a means for supplying a bus lock signal to at least one other of the system units, and a means responsive to absence of the bus lock signal. Each of the bus grant signal presence responsive means and the bus lock signal absence responsive means coact to initiate a bus cycle by their one of the system units.

In accordance with another aspect of the invention, a microprocessor is provided which executes both arithmetic operations in a first plurality of bits and floating point operations in a mantissa field and an exponent field, each having a second plurality of bits lesser than the first plurality of bits. A microcode storage means stores common microcode instructions utilizable in different floating point operations. A programmable logic array is connected to supply addresses to the microcode storage means and to supply a signal indicating floating point operation type to a data path in the microprocessor responsive to the microcode instructions. The data path includes means for selectively inhibiting supply of the exponent field when carrying out operations on the mantissa field. There is a means responsive to information in the exponent field for indicating an overflow condition and an underflow condition in the exponent field. A means is responsive to the overflow and underflow indicating means for providing branching instructions during the floating point operations. A means provides an output indicating normalization. The branching instruction providing means is also responsive to the normalization output. A means is connected to provide a carry in input to the least significant one of the second plurality of bits in the mantissa field in the data path. The data path includes a shifter connected to shift and rotate the second plurality of bits in both the mantissa field and the exponent field. A sticky flipflop is connected in the data path. Means is connected in the data path to sign extend information in the exponent field.

In accordance with another aspect of the invention, a microprocessor includes a pending interrupt register connected to mask and enable logic. An output of the mask and enable logic is connected to a priority encoder. The priority encoder is connected to supply a highest priority interrupt value to an interrupt latch in response to an interrupt request supplied to the pending interrupt register. The interrupt latch has a plurality of bits each connected to supply an output to a next adjacent more significant bit of a bus connected to supply the latch outputs to generate a memory address in which a current state of the microprocessor is stored.

In accordance with another aspect of the invention, a microprocessor includes a pipelined path for flow of instructions in the microprocessor. A microcode address multiplexer is connected to supply addresses from a plurality of different inputs to a microcode storage means. The microcode storage means is connected to supply microcode in response to the addresses to a microcode register. The microcode register is connected to supply branch control information to a branch control means. The branch control means is connected to receive branch inputs externally of the microprocessor, internally of the microprocessor, and from a microcode address programmable logic array. The microcode programmable logic array is connected to supply microcode addresses to the microcode address multiplexer. The branch control means is connected to control operation of the microcode address multiplexer.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1. is a key showing placement of FIGS. 1A and 1B.

FIGS. 1A and 1B are a generalized block diagram of a microprocessor in accordance with the invention.

FIG. 2 is a timing generator state diagram for the microprocessor of FIGS. 1A and 1B.

FIG. 3 is an external view of the microprocessor of FIGS. 1A and 1B, showing external signals supplied to and from the microprocessor.

FIG. 11 is a key showing placement of FIGS. 11A and 11B.

FIGS. 11A and 11B are a more detailed block diagram of a portion of the microprocessor shown in FIGS. 1A and 1B.

FIG. 13 is a key showing placement of FIGS. 13A and 13B.

FIGS. 13A and 13B are a more detailed block diagram of another portion of the microprocessor shown in FIGS. 1A and 1B.

FIG. 18 is a block diagram of a portion of the microprocessor system shown in FIG. 11B.

DETAILED DESCRIPTION OF THE INVENTION

Figure 1B:
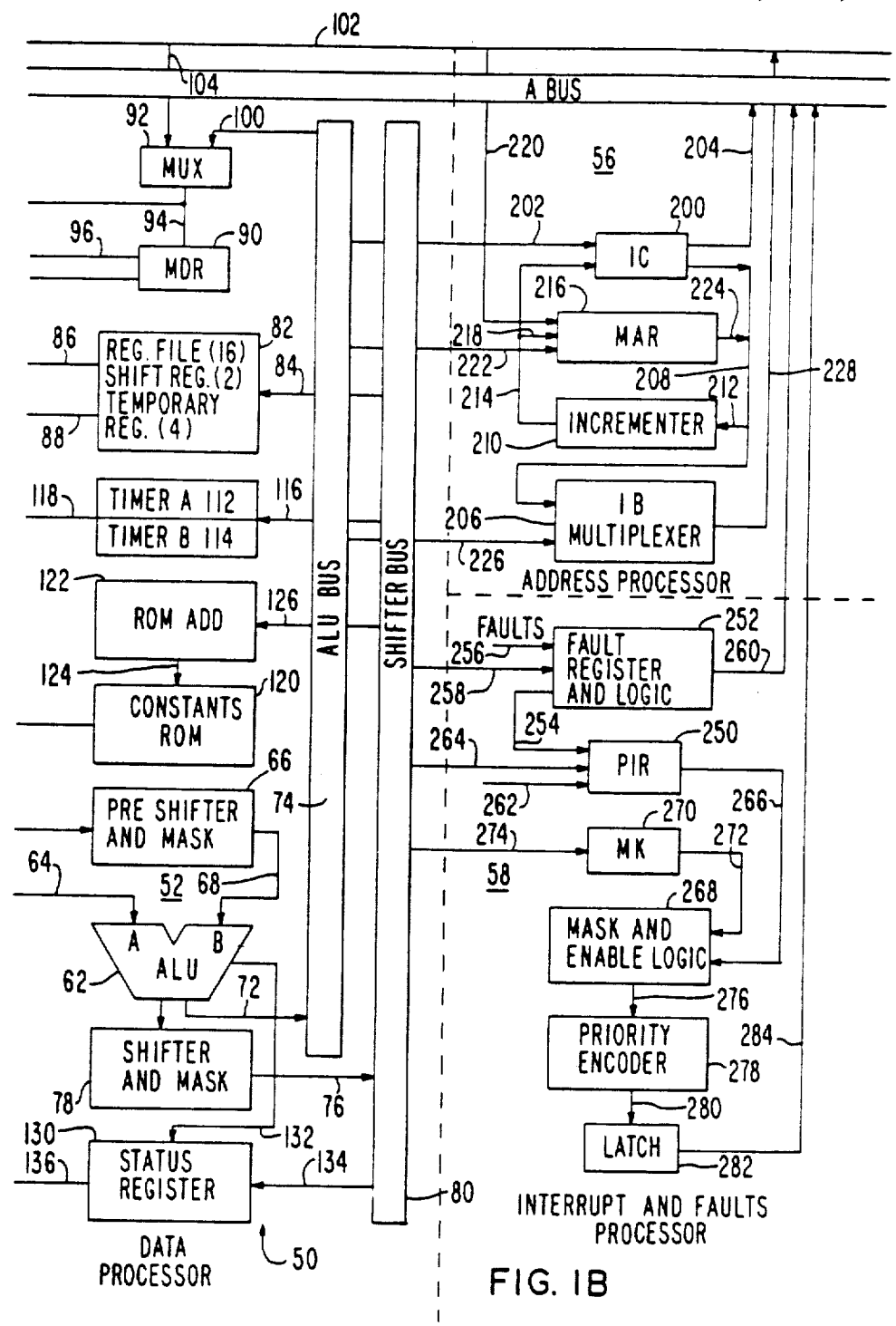
Figure 4:
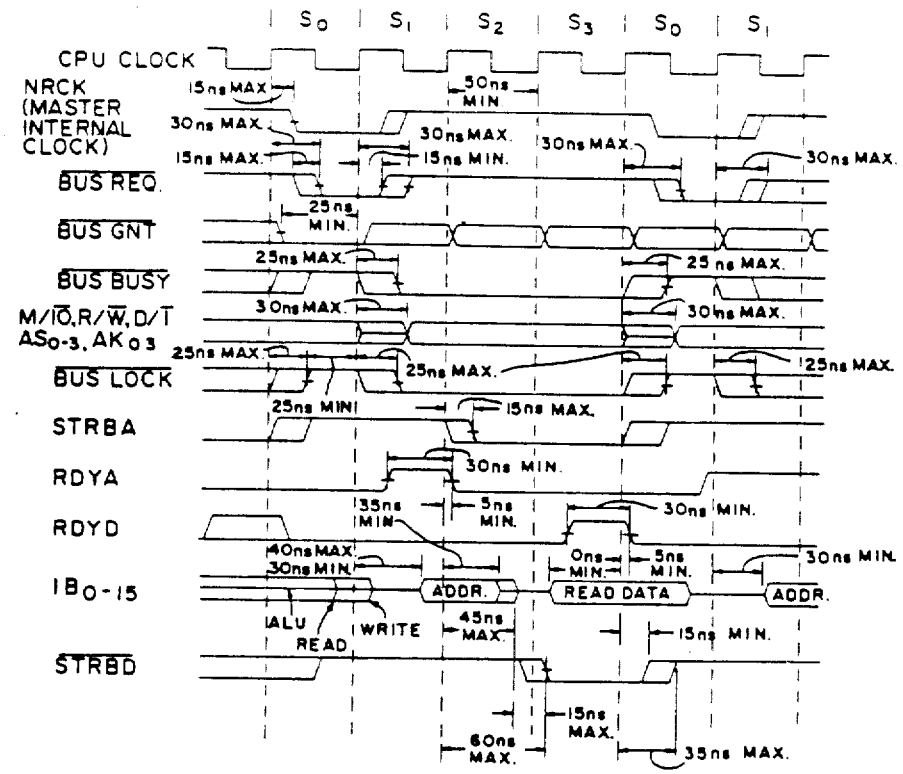
FIGS. 4, 5, 6, 7, 8 and 9 are timing diagrams useful for understanding operation of the microprocessor shown in FIGS. 1A, 1B and 3.
Figure 5:
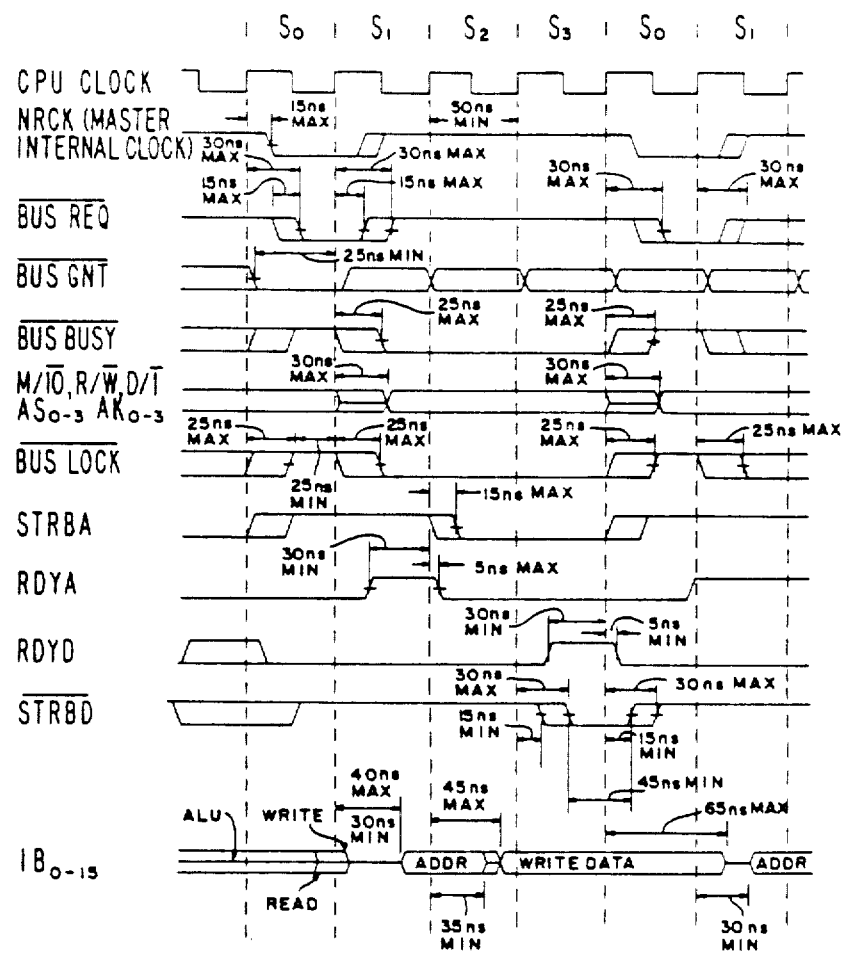
Figure 6:
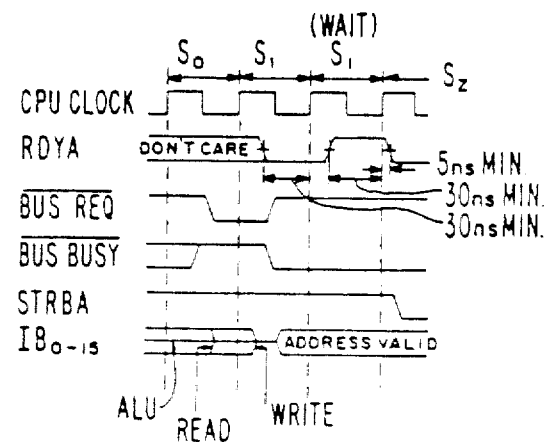

Turning now to the drawings, more particularly to FIGS. 1A and 1B, there is shown a block diagram of a microprocessor 50 in accordance with the invention. The microprocessor 50 consists of five main sections: a data processor 52, a microprogrammed control 54, an address processor 56, an interrupt and fault processor 58, and a timing unit 60.

The 16 bit wide data processor section 52 is responsible for all data processing in the microprocessor 50. The data processor 52 includes the functional blocks discussed below. A 17 bit arithmetic logic unit (ALU) 62 receives inputs at 64 from an A input bus 66, and at 68, through a preshifter and mask 66, from B input bus 70. Outputs from the ALU 62 are supplied at 72 to an ALU bus 74, and at 76, through shifter and mask 78, to a shifter bus 80. Register file 82 contains 16 general purpose registers $R_0$-$R_{15}$ and six working registers. The register file 82 receives inputs from ALU bus 74 at 84 and provides inputs to the A input bus 66 and the B input bus 70 at 86 and 88, respectively. A memory data register 90 receives inputs from multiplexer 92 at 94 and supplies inputs to the A input bus 66 and the B input bus 70 at 96 and 98, respectively. The multiplexer 92 receives inputs from the ALU bus 74 at 100 and from the information bus 102 at 104. The multiplexer 92 also supplies inputs at 106 to instruction register 108 in the microprogrammed control section 54. The instruction register 108 provides inputs at 110 to the A input bus 66. Two timers 112 and 114 receive inputs from shifter bus 80 at 116 and provide inputs at 118 to the A input bus 66. A constants read only memory (ROM) 120 receives ROM addresses from ROM address register 122 at 124. The ROM address register 122 receives inputs from the shifter bus at 126. A status register 130 receives inputs from the ALU 62 at 132 and from the shifter bus 80 at 134. The status register 130 provides inputs to A input bus 66 at 136.

The instruction register 108 in microprogrammed control section 54 provides new instructions fetched into the instruction register 108 to the mapping PLA 150 at 152. The mapping PLA 150 generates the pointers necessary for both execution and the effective address routines, indicated at 154, which are supplied to multiplexer 156 at 158. The multiplexer 156 provides inputs at 160 to the microcontrol store 162, which contains the execution and the effective address routines. The microcontrol store 162 generates three output fields to the microprogram register 164 at 166. The next address field supplied to microprogram register 164 is supplied at 168 to multiplexer 156. The multiplexer 156 also supplies inputs at 170 to incrementer 172. The incrementer 172 provides inputs to the next address register 174 at 176. The next address register 174 provides inputs at 178 to the multiplexer 156. The microprogram register 164 supplies the branch field output from microcontrol store 162 to a branch PLA 180 at 182. The branch PLA 180 provides inputs to the multiplexer 156 at 183. Branch conditions are supplied to the branch PLA 180 by the data processor section 52 at 184. The third output field from microcontrol store 162 supplied through the microprogram register 164 controls operation of all the components in the data processor 52 and is supplied to the data processor section 52 at 186.

The address processor section 56 includes an instruction counter (IC) 200, which receives inputs from the ALU bus 74 at 202. The IC 200 supplies instruction addresses to the A input bus 66 at 204. The IC 200 also supplies the instruction addresses to the information bus multiplexer 206 at 208, and to the incrementer 210 at 212. Outputs from the incrementer 210 are supplied to the IC 200 at 214, and to a memory address register (MAR) 216 at 218. Additional inputs to the MAR 216 are supplied by the information bus 102 at 220 and the ALU bus 74 at 222. The MAR 216 determines the addresses for all operands and supplies the address outputs at 224 to the incrementer 210 and the information bus multiplexer 206. An additional input to the information bus multiplexer 206 is supplied by the ALU bus 74 at 226. The output of the information bus multiplexer 206 is supplied to the information bus 102 at 228. The incrementer 210 provides IC and operand address updates paralleling operation of the data processor section 52.

The interrupt and faults processor section 58 handles all interrupts and faults, whether generated internally or externally of the microprocessor 50. The interrupts and fault processor 58 has a pending interrupt register (PIR) 250. A fault register and logic (FT) 252 provides inputs to the PIR 250 at 254. Fault inputs are supplied to the FT 252 at 256, and from the shifter bus 80 at 258. Outputs from the FT 252 are also supplied to the A input bus 66 at 260. Additional interrupt inputs to the PIR 250 are supplied at 262, and from the shifter bus 80 at 264. Outputs from the PIR 250 are supplied at 266 to mask and interrupt enable logic 268. A mask register (MK) 270 provides inputs at 272 to mask and interrupt enabling logic 268. Inputs to the MK 270 are provided from shifter bus 80 at 274. The mask and interrupt enabling logic 268 provides outputs at 276 to a priority encoder 278. The priority encoder 278 provides outputs at 280 to a latch 282. The latch 282 provides outputs at 284 to the A input bus 66.

The timing unit 60 generates internal and external strobes required for internal operation of the microprocessor 50 and different bus transactions. Internal inputs are provided to and from a timing arbitration unit 290 at 292. Inputs external of the microprocessor 50 are provided to and from the timing arbitration 290 at 294.

A basic machine cycle for the microprocessor 50 may comprise 3, 4 or 5 CPU clock cycles or states as shown in the state diagram of FIG. 2. The legends used in FIG. 2 have the meanings shown below in Table 1.

| A | = | Asserted (active) |
|---|---|---|
| NA | = | Not Asserted |
| ALBR | = | ALU Branch cycle (5 states) - internal signal |
| ABRT | = | Abort condition - internal signal |
| $\overline{\text{BUS REG}}$ | = | Bus Request |
| $\overline{\text{BUS GNT}}$ | = | Bus Grant input |
| $\overline{\text{BUS LOCK}}$ | = | Bus Lock |
| RDYA | = | RDYA input |
| RDYD | = | RDYD input |
| $S_z$ | = | High impedance state - CPU drivers are 3-state |

A three-state cycle, consisting of states $S_0$, $S_4$ and $S_5$ is used for operations purely internal to the ALU 62. A four-state cycle consisting of states $S_0$, $S_1$, $S_2$ and $S_3$ is used for minimum length operations utilizing one of the buses. A five-state cycle, consisting of states $S_0$, $S_1$, $S_2$, $S_3$, and $S_{3A}$ or $S_0$, $S_4$, $S_5$, $S_{5A}$ and $S_{5B}$ applies for those operations that use the result of a current operation of ALU 62 to determine the next address in the microprogrammed control store 162. The five-state cycle also applies to those operations following an abort condition. Every timing cycle starts with state $S_0$, in which the timing unit 60 receives the control information needed to initiate a bus cycle or an internal ALU cycle.

A bus cycle can be extended by manipulating $\overline{\text{BUS}}$ $\overline{\text{GNT}}$, RDYA or RDYD external inputs. These signals hold the microprocessor 50 in high impedance state $S_z$ when the bus 102 is assigned to another microprocessor 50 or direct memory access (DMA) device, state $S_1$, the address phase, or state $S_3$, the data phase, respectively, as shown in FIG. 2.

Further details on the states shown in FIG. 2 are provided in the timing diagrams of FIGS. 4-8, which are described below in connection with FIG. 3, which shows the external inputs to and from the microprocessor 50. The clock inputs 300 to the microprocessor 50 include a 0-20 MHz CPU CLK signal at 302 and a 100 kHz timer CLK signal at 304. External requests 306 include a $\overline{\text{RESET}}$ signal at 308, which initializes the microprocessor 50 in its active low state, and a $\overline{\text{CON}}$ $\overline{\text{REQ}}$ signal, which initiates console operations after the current instruction being executed by the microprocessor 50, in its active low state.

A total of nine interrupt inputs 310 are provided to the microprocessor 50. A PWRDN INT signal 312, for a power down interrupt, is active on its positive going edge or its high level, according to the interrupt mode bit in the configuration register. $USR_0$ INT through $USR_5$ INT signals at 314 are user interrupts, active on the positive going edge or high level, according to the interrupt mode bit in the configuration register. The $IOL_1$ INT and $IOL_2$ INT signals at 316 are input/output level interrupts, which are active high inputs that can be used to expand the number of user interrupts.

Faults inputs are provided to the microprocessor 50 at 318. The $\overline{\text{MEM PRT ER}}$ signal at 320 represents a memory protect error and is an active low input generated by an external memory management unit (MMU) and/or an external block protect unit (BPU). It is sampled by a $\overline{\text{BUS BUSY}}$ signal described below into bit 0 of fault register 252 in a $\overline{\text{CPU bus cycle}}$, or bit 1 if a non-CPU bus cycle. A $\overline{\text{MEM PAR ER}}$ signal at 322 represents a memory parity error and is an active low input sampled by the $\overline{\text{BUS BUSY}}$ signal into bit 2 of the fault register 252. A $\overline{\text{EX ADR ER}}$ signal 324 represents an external address error and is an active low input sampled by the $\overline{\text{BUS BUSY}}$ signal into bit 5 or bit 8 of the fault register 252. $SYSFLT_0$ and $SYSFLT_1$ signals at 326 represent system faults and are active on the positive going edge to set bit 7 or bits 13 and 14, respectively, in the fault register 252.

The $IB_0$ through $IB_{15}$ information bus input and output signals at 328 represent active high bi-directional, time multiplexed, address and data information on the 16 bit information bus 102. The bus 102 is three-stated during bus cycles not assigned to the microprocessor 50. The $IB_0$ signal is the most significant bit.

Status bus outputs from the microprocessor 50 are provided at 330. The AK0 through AK3 address key signals at 332 are active high outputs used to match with an access lock in an external MMU for memory accesses. A mismatch is one of several possible situations causing the MMU to pull the $\overline{\text{MEM PRT ER}}$ signal at 320 to its active low state. AS0 through AS3 address state signals at 334 are active high outputs which select the page register group in the external MMU.

Error outputs are provided at 336. A UNRCV ER unrecoverable error signal at 338 is an active high output indicating the occurrence of an error classified as unrecoverable. The instruction in which the error occurred is aborted. The MAJ ER major error signal at 340 is an active high output indicating the occurrence of an error classified as major. The instruction in which the error occurred is also aborted.

Discrete outputs from the microprocessor 50 are provided at 342. The DMA EN direct memory access enable signal at 344 is active high and indicates that DMA is enabled. DMA is disabled when the external request $\overline{\text{RESET}}$ signal is active. An $\overline{\text{NML PWRUP}}$ signal at 346 is active high and indicates when the microprocessor 50 has completed its built in test in an initialization sequence successfully. The SNEW start new signal at 348 is active high and indicates that a new instruction will start executing in the next cycle. This information is useful for instruction tracing. The TRIGO RST trigger go reset signal at 350 is an active low discrete output.

Bus control inputs and outputs to and from the microprocessor 50 are provided at 352. The R/$\overline{W}$ read or write output signal at 354 indicates the direction of data flow. A high signal indicates a read or input operation and a low signal indicates a write or output operation. The output at 354 is three-stated during bus cycles not assigned to the microprocessor 50. The M/$\overline{IO}$ memory or I/0 output signal at 356 indicates whether a current bus cycle is a memory (high) or I/0 operation (low). The output 356 is three-stated during bus cycles not assigned to the microprocessor 50. A D/$\overline{I}$ data or instruction output signal at 358 indicates a current bus cycle access is for data if high or for instruction if low. The output 358 is three-stated during bus cycles not assigned to the microprocessor 50. The STRBA address strobe signal at 360 is used for latching the memory or XIO address in its active high output in an external latch at the high to low transition of the strobe. The output 360 is three-stated during bus cycles not assigned to the microprocessor 50. The RDYA address ready signal is supplied at 362 and is an active high input used to extend the address phase of a bus cycle. The $\overline{STRBD}$ data strobe signal at 364 is an active low output used for strobing data in memory and XIO cycles. The output at 364 is three-stated during bus cycles not assigned to the microprocessor 50. The RDYD data ready signal at 366 is an active high input used to extend the data phase of a bus cycle. Wait states are inserted as long as RDYD is not active to accommodate slower memory devices.

Bus arbitration inputs and outputs are supplied to and from the microprocessor 50 at 370. The $\overline{BUS\ REQ}$ output signal at 372 is an active low output indicating that the microprocessor 50 requires the bus. This signal becomes inactive as soon as the microprocessor 50, has acquired the bus and started the bus cycle. The $\overline{BUS\ GNT}$ signal supplied at 374 from an external arbiter is an ective low input which indicates that the microprocessor 50 currently has the priority bus request. If the bus is not locked, the microprocessor 50 may begin a bus cycle commencing with the next CPU clock. The $\overline{BUS\ BUSY}$ signal at 376 is an active low bi-directional signal used to establish the beginning and end of a bus cycle. The trailing edge low to high transition is used for sampling bits into the fault register 252. This signal is three-stated in bus cycles not assigned to the microprocessor 50. However, the microprocessor 50 monitors the $\overline{BUS\ BUSY}$ line 376 for latching other than microprocessor 50 bus cycle faults into the fault register 252. The $\overline{BUS\ LOCK}$ signal at 378 is an active low, bi-directional signal used to lock the bus for successive bus cycles. During non-locked bus cycles, $\overline{BUS\ LOCK}$ mimics $\overline{BUS\ BUSY}$. $\overline{BUS\ LOCK}$ is three-stated during bus cycles not assigned to the microprocessor 50.

Lines 380 of the microprocessor are grounded. Line 382 supplies a $V_{cc}$, nominally +5 V, 225 mA, input to the microprocessor 50. Lines 384 supply a $V_{INJ1}$ and $V_{INJ2}$ inputs, nominally +1.3 V, 1.4 A, to the microprocessor 50.

Details of bus transactions with the microprocessor 50 are shown in FIGS. 4 through 9.

Bus Transactions

Bus transactions are four states long (a state is equivalent to one CPU clock period). Memory and I/0 cycles have identical timing requirements and are distinguished by the status of the M/IO line 356.

Figure 7:
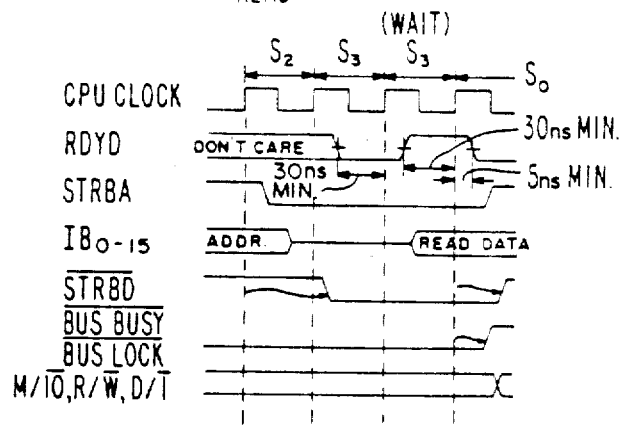
Figure 8:
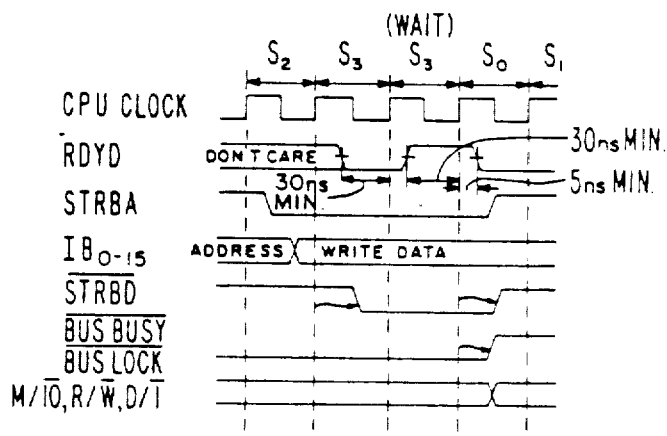
Figure 9:
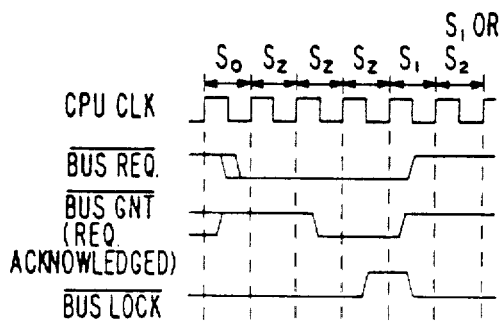

The master internal clock (NRCK-FIGS. 4 and 5) is active LOW during state $S_0$. The falling edge of NRCK activates $\overline{BUS\ REQ}$ output indicating to the external arbiter (if any) that this CPU 50 requests the bus. At the end of state $S_0$, the CPU 50 samples the status of $\overline{BUS\ GNT}$ to be active (in a uniprocessor system, no arbiter is needed and $\overline{BUS\ GNT}$ 374 is wired LOW). Simultaneously, the $\overline{BUS\ LOCK}$ input 378 should be not active (HIGH) for the CPU to enter state $S_1$ (FIG. 9). Once in state $S_1$, $\overline{BUS\ REQ}$ 372 is deactivated to allow other bus contenders bidding early for the next bus cycle. The CPU 50 activates $\overline{BUS\ BUSY}$, $\overline{BUS\ LOCK}$, status information and outputs the address after some delay measured from the start of $S_1$ state. At the end of $S_1$, the CPU 50 samples the RDYA input 362. If LOW, the CPU stays in the $S_1$ state (FIG. 6), extending the address phase on the bus. Otherwise, it proceeds to state $S_2$ and then unconditionally to state $S_3$. Once in state $S_2$, the CPU drops STRBA LOW (this edge is used to latch the address in an external address latch) and activates $\overline{STRBD}$ output 364 for Read cycles only, where the CPU gets ready to receive read data by turning the address/data bus around. For Write cycles, the CPU starts outputting the write data immediately after the address. $\overline{STRBD}$ is activated during $S_3$ allowing both a reasonable set-up time for write data-to-$\overline{STRBD}$ falling edge and reasonable hold time for $\overline{STRBD}$ rising edge-to-write data going away. RDYD is sampled at the end of $S_3$ and the bus cycle is terminated when RDYD is HIGH; otherwise, it stays in $S_3$ (FIGS. 7 and 8). At the end of the bus cycle, all CPU outputs are three-state.

All XIO and VIO commands are echoed back to the external world in a form of an I/0 Write cycle. The address is the command itself, and the write data is the result of the execution phase, if applicable. (It is the system's responsibility to provide RDYA and RDYD in these cycles.)

Table II depicts the maximum access time required by the system at various operating frequencies. The access time includes address latches, address decoders delays and system memory chip enable access time.

TABLE II

| CPU Clock (MHz) | System Memory Address Access Time** (ns) | | | | |
|---|---|---|---|---|---|
| | No* Wait | 1* Wait | 2* Waits | 3* Waits | 4* Waits |
| 20 | 100 | 150 | 200 | 250 | 300 |
| 18 | 117 | 172 | 228 | 283 | 339 |
| 16 | 138 | 200 | 263 | 325 | 388 |
| 10 | 250 | 350 | 450 | 550 | 650 |

*A Wait state is inserted due to either RDYA or RDYD not being active when sampled by the CPU at the proper time.
**System memory address access time is maximum and includes address latch and address decoder delays.

The microprocessor 50 of this invention processes the following data types.

Data Types

Bytes (8 bits)
Words (16 bits)
Double words (32 bits)
single precision floating point (32 bits)

Extended precision floating point (48 bits)

The floating point numbers are represented by a fractional two complement mantissa (24 bits for single-precision and 40 bits for extended precision) and an 8-bit twos complement exponent, (Table III).

TABLE III

Single Precision

| 0 | 23 24 | 31 |
|---|---|---|
| S MANTISSA | EXPONENT | |

Double Precision

| 0 | 23 24 | 31 32 | 47 |
|---|---|---|---|
| S MANTISSA | EXPONENT | MANTISSA | |

Register Set

Figure 10:
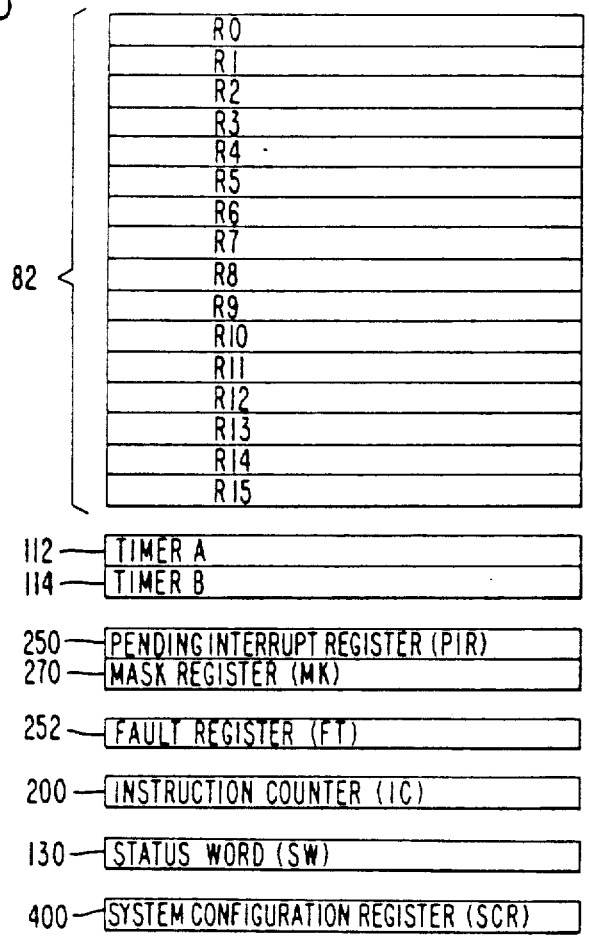
FIG. 10 is a more detailed block diagram of a portion of the microprocessor shown in FIGS. 1A and 1B.

There are 16 user-accessible registers R0–R15 in the register file 82, FIG. 10, plus the pending interrupt register 250, mask register 270, fault register 252, status register 130, two timers 112, and 114, instruction counter 200 and system configuration register 400 in the register set.

Status Register 130

The status word (SW) is 16 bits wide, defined as follows

| 0 1 2 3 | 4 | 7 8 | 11 12 | 15 |
|---|---|---|---|---|
| C P Z N | RESERVED | | AK(PS) | AS |

C: Carry
P: Positive
Z: Zero
N: Negative
AK (PS): Access key/processor state bits serve two functions:

(1) Determine the legal/illegal criteria for privileged instructions. A privileged instruction is executed with PS = 0 only. An attempt to execute a privileged instruction with PS ≠ 0 will cause a major error, set bit 10 in the fault register 252, and cause an instruction abort, explained more fully below in connection with fault register 252.

(2) Defines the acess key that is used in systems with an MMU to match with an access lock.

AS: Address state defines a page register group in the memory management unit (MMU). For implementations that do not include MMU, an address state fault is generated (bit 11 in the fault register is set) for any operations attempting to modify the AS field to a non-zero value.

System Configuration Register (SCR) 400

The system configuration register is five bits wide and is defined as follows (bits 0 through 4):
MMU Present: "1" if MMU is connected in the system
BPU Present: "1" if BPU is connected in the system
Console Present: "1" if console is connected in the system
Co-Processor: "1" if co-processor is connected in the system
Interrupt Mode: Selects interrupt mode for PWRDN INT and $USR_0INT$–$USR_4INT$. "1" level sensitive, "0" –edge (LOW-to-HIGH) sensitive.

Timer A 112 and Timer B 114

The two timers 112 and 114 are 16 bits wide and are started, halted, loaded, and read under software control Timer A 112 gets the timer clock (100 kHz) and timer B 112 gets timer clock divided by 10.

When timer A 112 and timer B 114 reach their terminal counts, they set the corresponding bits in the PIR 250 (see Interrupts). Both are halted when the CPU 50 is in console mode.

Fault Register (FT)

The 16 bits of the fault register 252 have the significance indicated below:
Bit 0 CPU memory protect error
Bit 1 Non-CPU memory protect error
Bit 2 Memory parity error
Bit 3 Spare
Bit 4 Spare
Bit 5 Illegal I/0 address
Bit 6 Spare
Bit 7 System fault 0
Bit 8 Illegal memory address
Bit 9 Illegal instruction
Bit 10 Privileged instruction
Bit 11 Address state error
Bit 12 Spare
Bit 13 BITE (built-in test) or system fault 1
Bit 14 Spare
Bit 15 System fault 1

System fault 0 and system fault 1 are asynchronous, edge-sensitive inputs to the microprocessor 50.

Any bit set in the fault register 252 can cause a level 1 interrupt. Major or unrecoverable errors as defined below will cause the CPU 50 to abort the current instruction.

Major Errors

Privileged instruction
CPU access mode
CPU write protect
CPU data illegal address
Illegal I/0 address

Unrecoverable Errors

Illegal instruction
Instruction protect fault
Instruction parity
Instruction illegal address
Address state fault

Interrupts

There are 16 levels of interrupt prioritized on chip as indicated in Table 4. Nine are external, of which two are level sensitive ($IOL_1$ INT, $IOL_2$ INT). The other seven external interrupts are either level or edge-sensitive, according to the interrupt mode bit in the configuration register. All interrupts are latched into the pending interrupt register (PIR) 250 and may be disabled, or masked by the mask register (MK) 270, except as indicated in the table.

An enabled interrupt with highest priority that is not masked is processed as follows. Upon completion of the current instruction that is not aborted, further interrupts are disabled, and the enabled interrupt reads with AS=0. (via the service pointer) the new mask, status word, and instruction counter.

Interrupts are acknowledged by resetting the acknowledged interrupt bit in the PIR and executing an I/O cycle during which the acknowledged interrupt number is sent to I/O device 1000. Level interrupt requests should be removed within two machine cycles after the I/O acknowledged cycle. This period could be extended by inserting wait states.

The pending interrupt register can be loaded via a privileged XIO instruction to generate simulated interrupts.

The executive call is invoked by the BEX instruction that provides a means to jump to a routine in another address state (AS). It is typically used to make controlled, protected calls to an executive using one of 16 executive entry points.

TABLE IV

| | Priority (PIR/MK bit number) | Interrupt Linkage Pointer Address (Hex) | Interrupt Service Pointer Address (Hex) |
|---|---|---|---|
| Power Down[1] | 0[3] | 20 | 21 |
| Machine Error[2] | 1 | 22 | 23 |
| User 0 | 2 | 24 | 25 |
| F.P. Overflow | 3 | 26 | 27 |
| Fixed Point Overflow | 4 | 28 | 29 |
| Executive Call[1] | 5 | 2A | 2B |
| F.P. Underflow | 6 | 2C | 2D |
| Timer A | 7 | 2E | 2F |
| User 1 | 8 | 30 | 31 |
| Timer B | 9 | 32 | 33 |
| User 2 | 10 | 34 | 35 |
| User 3 | 11 | 36 | 37 |
| I/O Level 1 | 12 | 38 | 39 |
| User 4 | 13 | 3A | 3B |
| I/O Level 2 | 14 | 3C | 3D |
| User 5 | 15 | 3E | 3F |

Notes:
[1]Cannot be masked or disabled
[2]Cannot be disabled
[3]Interrupt level 0 has the highest priority FIGS. 11A and 11B, 12 and 13A and 13B are more detailed block diagrams of the microprocessor shown in FIGS. 1A and 1B. Microcode ROM 500 (FIG. 11B) is connected by lines 502 to branch code register 504, to nano control register 506 by lines 508, and by lines 510 to next address register 512. The output of branch code register 505 is connected by lines 514 to branch PLA and logic 516. The ten indicated signals are supplied on lines 518 to the branch PLA and logic 516. The CUT 1H signal is supplied to the branch PLA and logic on lines 520. The INBRH and INBSH signals are supplied to PLA and logic 516 on lines 522. The ALSGH and ALZRH signals are supplied to PLA and logic 516 on lines 524. The PWRRH and CORQH signals are supplied to PLA and logic 516 on line 526 from synchronization logic 528. The NRCK and CPCK clock signals are supplied to synchronization logic 528 on line 530. The CONREQ and RESET signals, respectively, are supplied to the synchronization logic 528 on lines 532 and 534. The synchronization logic 528 also produces the RESL1 signal on line 536. The DST0H through DST3H signals are supplied to PLA and logic 516 on lines 538. The ST0H through ST3H signals are supplied to the PLA and logic 516 on lines 540. An output or miscellaneous circuit 542 is connected to the PLA and logic 516 by line 544. The miscellaneous circuit 542 also provides the FLT0H and FLT1H signals on lines 546 and the LTENL and SBEXL signals on lines 548. One input to the miscellaneous circuit 542 is provided by the PLA and logic 516 on line 550 as the SNEWL signal. The second input to miscellaneous circuit 542 is provided by logic circuit 552 on line 554. The input to logic circuit 552 is provided on line 556 by miscellaneous latch 558 as the FLT0 signal. Another output from the miscellaneous latch 558 is the FLT1 signal on line 560. The remaining output from miscellaneous latch 558 on line 562 is supplied to index detector 564. One input to miscellaneous latch 558 is provided by latch enable logic 566 as the PTLAH signal on line 568. The PTLAH signal is also supplied on line 570. The inputs to latch enble logic 566 are the fetch, IOPL, CCNL and AIRSL signals on lines 572, 574, 576, and 578, respectively. Another output from the miscellaneous latch circuit 558 is supplied on line 565 to the DODA latch. The remaining inputs to miscellaneous latch 558 are the INDXH, DOAMH, FLPOL and FLPIL signals on lines 580, supplied by opcode PLA 582. OC00 through OC07 input signals to the opcode PLA 582 are supplied on lines 584. The IOPL signal is supplied to opcode PLA 582 on line 586, and also as one input to OR gate 588 on line 590. The other input to OR gate 588 is supplied on line 592 by 4A/7F/EC detector circuit 592. The 4A/7F/EC detect circuit 594 is connected by lines 596 and 598 to C1 (see also FIG. 12). Lines 584 are also connected by lines 598 to C1. The output of OR gate 588 on line 600 forms one input to multiplexer 602. Additional inputs to multiplexer 602 are supplied from C1 by lines 598 and 604. The output of multiplexer 602 is the OC08-OC11 signals on lines 606, supplied as the remaining inputs to opcode PLA 582. Inputs from C1 through lines 598 and 604 are connected by lines 608 to zero detection circuit 610. The output of zero detection circuit 610 is connected by lines 612 to external I/0 detection logic 614. The other inputs to external I/O detection logic 614 are the GCIOL signal on line 616 from opcode PLA 582 and the IOPL signal on line 618. The output of detection logic 614 is supplied as one input to multiplexer 622. The 07E and IR00H signals on lines 624 and 626 form additional inputs to the multiplexer 622. The remaining inputs to multiplexer 622 are the EX00L through EX09L signals supplied by opcode PLA on lines 628. The output of multiplexer 622 on lines 630 is one input to execution latch 632. A second input to execution latch 632 is provided by DODA latch 634 on line 636. One input to DODA latch 634 is provided by the miscellaneous latch 558 on line 565. The other input to DODA latch 634 is provided on lines 638 by multiplexer 640. The opcode PLA 582 supplies the DO03L through DO08L signals as an input to multiplexer 640 on lines 642. The 37F signal is provided as an additional input to multiplexer 640 on line 644. The remaining input to multiplexer 640 is supplied by the illegal condition detection logic 646 on line 648. The GCIOL and CONLH signals are supplied on lines 650 and 652, respectively, as inputs to the illegal condition detection logic 646. The DKO3H through DKO6H signals are supplied by DODA latch 634 on lines 54 as inputs to the discretes flipflops 656. The DKO3H through DKO6H signals are also supplied as inputs on lines 658 to the next microaddress multiplexer 660. Additional inputs to the next microaddress multiplexer are the SNA5L through SNA7L signals on lines 662 from PLA and logic 516, the A0 signal on line 664, the 30 signal on line 666, the output of index detector 564 on line 668, and the SNA0L through SNA4L signals from PLA and logic 516 on lines 670. Additional inputs to the next microaddress multiplexer are supplied by the output of execution latch 632 on lines 672, the output of next address register 512 on lines 674, and the output of increment register 676 on lines 678. The output of the next microaddress multiplexer is supplied on line 680 as the input to microcode ROM 500, on lines 682 as the inputs to increment register 676, and on line 684 as one input to 07E detector 686. The other input to 07E detector 686 is the NRCK clock signal on line 688. The output of 07E detector 686 is supplied on line 690 as an input to discretes flipflops 656. The remaining inputs to the discretes flipflops 656 are the NRCK clock signal on line 692 and the FCLEH signal on line 694. The output of discretes flipflops 656 are the STMAL, STMBL, DMA EN, ENINL, TRIGO RST and NMLPWRP signals, respectively, on lines 696, 698, 700, 702, 704 and 706.

The NRDTH signal is provided on line 708 as an output from nano control register 506. The NAAH signal is provided on lines 710 as an input to A address multiplexer 712. Additional inputs to the A address multiplexer 712 are supplied through C2, C4 and C5 on lines 714, 716 and 718. The NABH signal is supplied by nano control register 506 on lines 720 as an input to the B address multiplexer 722. Additional inputs to the B address multiplexer are supplied through C4 and C5 on lines 716 and 718, and by the ROM 2L signal on line 724 through C6. The NSHH output signal from nano control register 506 is supplied on line 726 through C9. Outputs from the nano control register 506 are supplied on lines 728 to decoder 730. The NAL0H through NAL2H, NCINH, NCMXH and NI57H signals are supplied as outputs from the decoder 730 on lines 732 through C8. The CFRWL signal is supplied by decoder 730 on line 734. The NMCYH, NMIOH, NMRWH and NMRWL signals are supplied by decoder 730 on lines 736 as inputs to timing arbitration unit 290 (see also FIG. 1A). Additional inputs to the timing unit 290 are the RESLL, BLOKH, BORTH, AFTPH and CDISH signals on lines 738, the T25OH and ALBRL signals on lines 740, the RDYD, RDYA and $\overline{\text{BUS GNT}}$ signals on lines 742, the $\overline{\text{CPU CLK}}$ signal on line 744, and the bi-directional $\overline{\text{BUS BUSY}}$ and $\overline{\text{BUS LOCK}}$ signals on lines 746. The outputs of timing unit 290 are the CPUCL, BBSYL, NRCKL, NCKDL, STSIL, FCLEL, SNLH, CPBSL, 1B1EH, 1B0EH and EDRVH signals on lines 748, the $\overline{\text{R/W}}$, $\overline{\text{M/IO}}$ and $\overline{\text{DI}}$ signals on lines 750, the STRBA and $\overline{\text{STRBD}}$ signals on lines 752 and the output $\overline{\text{BUS BUSY}}$ and $\overline{\text{BUS LOCK}}$ signals on lines 746.

The NSDH output signal is supplied by nano control register 506 on lines 754 through C3. The NADL and NADH output signals from nano control register 506 are supplied on lines 756 to IMACMD decoder 758. Additional inputs to the IMACMD decoder are the FCLEH, CNTIL, FETCH, INMRH, ABOTH, signals on lines 760, 762, 764, 766 and 768, respectively. The MPNH and MPNL output signals from nano control register 506 are supplied on lines 770 as input to the pins decoder 772. The other inputs to the pins decoder 772 are the DVTRH, FCLEH, NRCKL, AIRSL, PWRRH signals on lines 774, 776, 778, 780 and 782, respectively.

The NPAH output signals from nano control register 506 are supplied on lines 784 through C10. The NPBH output signals on lines 786 through C11 are the remaining outputs from nano control register 506.

The outputs from A address multiplexer 712 are the RFA0 through RFA5 signals, supplied on lines 800 to A address decoder 802. The outputs from B address multiplexer 722 are the RFB0 through RFB5 signals, supplied on line 804 to B address decoder 806. The outputs of the A and B address decoders 802 and 806 are shown to the left of those units. The EA00L through EA15L, EAB0L and EAB1L signals are supplied by the A address decoder 802 to register file 808 on lines 810, 812 and 814, respectively. The EB00L-EB15L, EBB0L and EBB1L signals are supplied by the B address decoder 806 on lines 816, 818 and 820 as inputs to the register file 808. The other inputs to register file 808 are the RFIHH, LERFL, NCKDL, FCLEH and NRDTH signals on lines 822, 824, 826, 828 and 830, respectively. The outputs of register file 808 are shown to the left of that unit. The outputs of the IMACMD decoder 758 and the pins decoder 772 are also shown to the left of each of those units. The inputs and outputs to the instruction and memory address register clock generator 832, the PIR multiplexer control and mask register clock generator 834 and A and B timers clock generator 836 are shown respectively to the left and right of each of those units.

Figure 12:
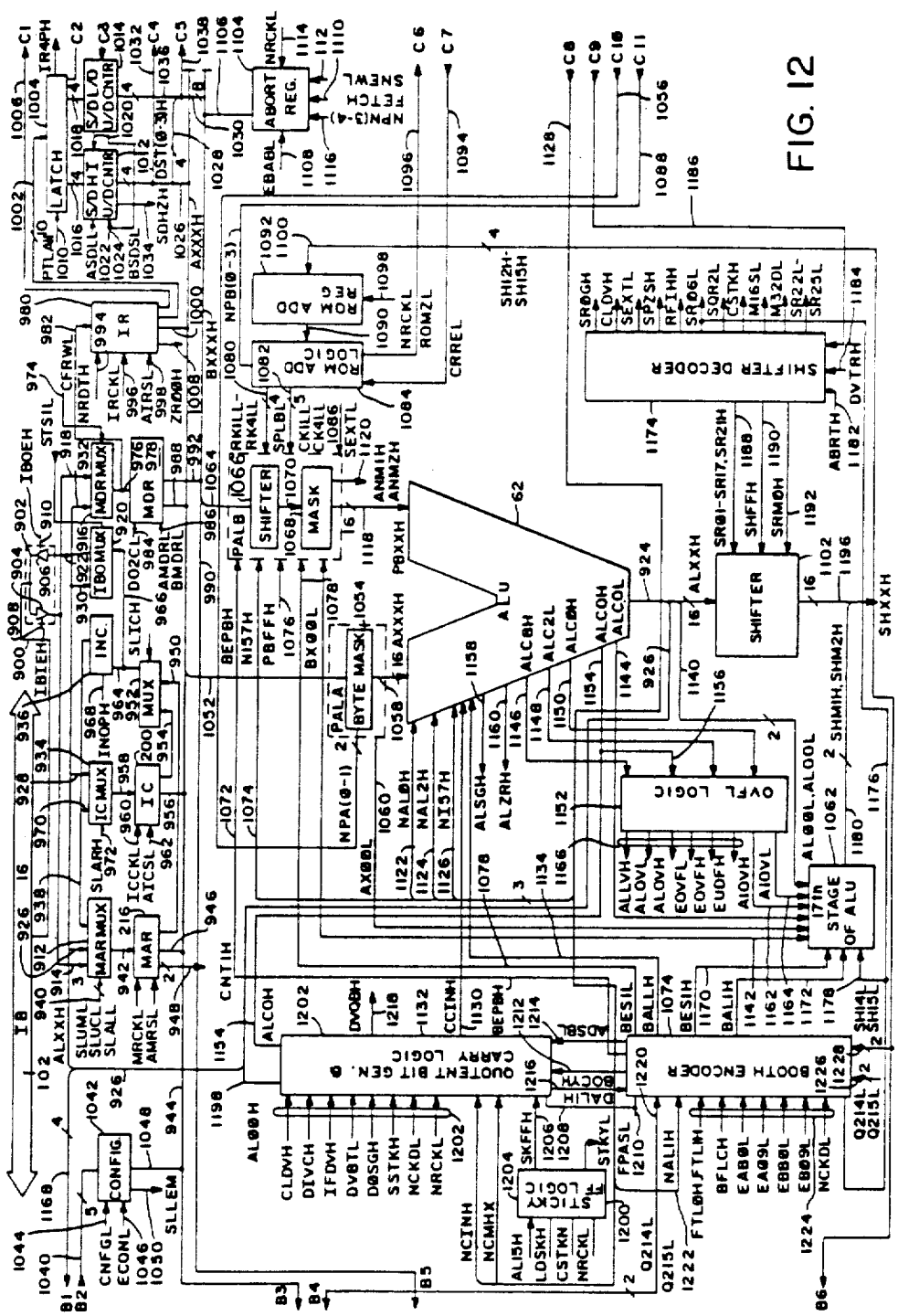
FIG. 12 is a more detailed block diagram of another portion of the microprocessor shown in FIGS. 1A and 1B.

Turning to FIG. 12, information bus 102 is connected by lines 900 and 902 to input and output amplifiers 904 and 906. Additional inputs to the amplifiers 904 and 906 are supplied by the IBIEH and IBOEH signals on lines 908 and 910, respectively. Input amplifier 904 is connected to memory address register multiplexer 912 by lines 914 and to memory data register and multiplexer 916 by lines 918. Information bus output multiplexer 920 is connected to output amplifier 906 by lines 922. The output of ALU 62 is connected by lines 924, 926, 928, 930 and 932 to the memory address register multiplexer 912, the instruction counter multiplexer 934, the information bus output multiplexer 920 and the memory data register multiplexer 916, respectively. Incrementer 936 provides an input to memory address register multiplexer 912 on line 938. The SLUML, SLUCL and SLALL signals provide additional inputs to the multiplexer 912 on line 940. The output of multiplexer 912 is supplied on lines 942 to memory address register 216. The memory address register 216 is connected to bus 944 by lines 946. The memory address register 216 provides the CUTIH and CNTIH signals on lines 948. The memory address register 216 is connected by lines 950 to multiplexer 952. Multiplexer 952 also receives inputs from instruction counter 200 on lines 954. Instruction counter 200 is connected to bus 944 by lines 956, and to the instruction counter multiplexer 934 by lines 958. Additional inputs to the instruction counter 200 are provided by the ICCKL and AICSL signals on lines 960 and 962. The output of multiplexer 952 is supplied to incrementer 936 on line 964, and to multiplexer 920 on line 966. An additional input to the incrementer is provided by the INOPH signal on line 968. The output of incrementer 936 is supplied to instruction counter multiplexer 934 on line 970. An additional input to the instruction counter multiplexer 934 is supplied by the SLARH signal on line 972.

The memory data register multiplexer 916 receives the CFRWL signal on line 974. The memory data register multiplexer 916 supplies its output on lines 976 to the memory data register 978, and to the instruction register 980 on lines 982. Additional inputs to the memory data register 978 are provided by the DO2CL, AMDRL and BMDRL signals on lines 984 and 986. The memory data register 978 is connected to bus 944 by lines 988, and to bus 990 by lines 992.

Additional inputs to the instruction register 980 are supplied by the NRDTH, IRCKL and AIRSL signals on lines 994, 996 and 998. The instruction register 980 is connected to bus 944 by lines 1000. Outputs from the instruction register 980 are supplied on lines 1002 to latch 1004. Outputs from the instruction register 980 are also provided on lines 1006 through C1 (see also FIG. 11A). The instruction register 980 also provides the ZR00H signal on line 1008.

Latch 1004 receives the PTLAH signal on line 1010. Latch 1004 provides outputs to the S/D HI U/D counter 1012 and the S/D LO U/D counter 1014 on lines 1016 and 1018, respectively. The counter 1014 supplies an input to the counter 1012 on line 1020. Additional inputs to the counter 1012 are the ASDLL signal on line 1022 and the BSDSL on line 1024. The counter 1012 is connected to bus 944 by lines 1026, to bus 990 by lines 1028 and 1030, and by lines 1032 through C4 (see also FIG. 11A). The counter 1012 also provides the SDHZH signal on line 1034. Counter 1014 is connected to bus 990 by lines 1036 and 1030. Lines 1028 also connect counter 1014 to bus 944. The outputs of both counters 1012 and 1014 and bus 990 are supplied on lines 1038 through C5 (see also FIG. 11A).

The SH00H through SH04H signals are supplied through B2 (see also FIG. 13B) on lines 1040 to configuration register 1042. Additional inputs to the configuration register 1042 are the CNFGL and ECONL signals on lines 1044 and 1046. Configuration register 1042 is connected by lines 1048 to bus 944. The SLEEH signal is also supplied by configuration register 1042 on line 1050.

Bus 944 is connected by bus 1052 to byte mask 1054. The other inputs to byte mask 1054 are the NPA0 and NPA1 signals supplied on lines 1056 through C10 (see also FIG. 11A). The AXXXH signals are supplied by byte mask 1054 on line 1058 as the A input to ALU 62. The AX00L signal ss supplied on line 1060 as one input to 17th stage of ALU1062. The BXXXH signals are supplied on bus 1064 to shifter 1066. The output of shifter 1066 is supplied to mask 1068 on lines 1070. Additional inputs to the shifter 1066 and mask 1068 are supplied by the BEPBH signal on line 1072 from booth encoder 1074, the NI57H signal supplied on line 1074 through C8 (see also FIG. 11A), the PBFFH signal, supplied on line 1076 and the BES1L signal, supplied on line 1078 from the booth encoder 1074. Additional inputs to the shifter 1066 and mask 1068 are supplied by the RK1LL through RK4LL signals on lines 1080, the SPLBL and CK1LL through CK4LL signals on lines 1082, all of these signals being provided by ROM address logic 1084. The SEXTL signal is also supplied to shifter 1066 and mask 1068 on line 1086.

Inputs to the ROM address logic 1084 are provided by NPB0 through NPB3 signals supplied on line 1088 through C11 (see also FIG. 11A), on lines 1090 from ROM address register 1092, and by the CRREL signal on line 1094 through C7 (see also FIG. 11A). The ROM address logic 1084 also provides the ROM2L signal on line 1096 through C6 (see also FIG. 11A).

The inputs to ROM address register 1092 are the NRCKL clock signal on line 1098 and the SH12H through SH15H signals on lines 1100 from shifter 1102.

Abort register 1104 is connected to bus 990 by lines 1106. The inputs to abort register 1104 are the EBABL, FETCH, SNEWL, NRCKL signals on lines 1108, 1110, 1112, 1114 and the NPN3 and NPN4 signals on lines 1116.

Mask 1068 provides the PBXXH signals on lines 1118 as the B input to ALU 62. Mask 1068 also provides the ANM1H and ANM2H signals on lines 1120. Additional inputs to the ALU 62 are the NAL0H, NAL2H and NI57H signals, supplied on lines 1122, 1124 and 1126, respectively, through C8 and line 1128 (see also FIG. 11A). The CCINH signal is supplied on line 1130 to ALU 62 by quotient bit generator and carry logic 1132. The BALLH signal is supplied by booth encoder 1074 on line 1134 to ALU 62.

The ALXXH output signals are supplied by ALU 62 on lines 924 to shifter 1102. AL00L and ALOOL signals are supplied by ALU 62 on lines 1140 to ALU 17th stage 1062. The BX00L signal is supplied on line 1142 to ALU 17th stage 1062 from shifter and mask 1066 and 1068. The ALCOL signal is supplied to ALU 17th stage 1062 by ALU 62 on line 1144. The ALC8H, ALC2L and ALCOH signals are supplied by ALU 62 on lines 1146, 1148 and 1150 to overflow logic 1152. The ALCOH signal is supplied to overflow logic 1152 by ALU 62 on lines 1154 and 1156, and to quotient bit generator and carry logic 1132 on line 1154. The ALU 62 also provides the ALSGH and ALZRH signals on lines 1158 and 1160.

Overflow logic 1152 provides the A1OVH and A1OVL signals on lines 1162 and 1164 to ALU 17th stage 1062. Overflow logic 1152 also provides the ALLVH, ALOVL, ALOVH, EOVFL, EOVFH and EUDFH signals on lines 1166.

Figure 13B:
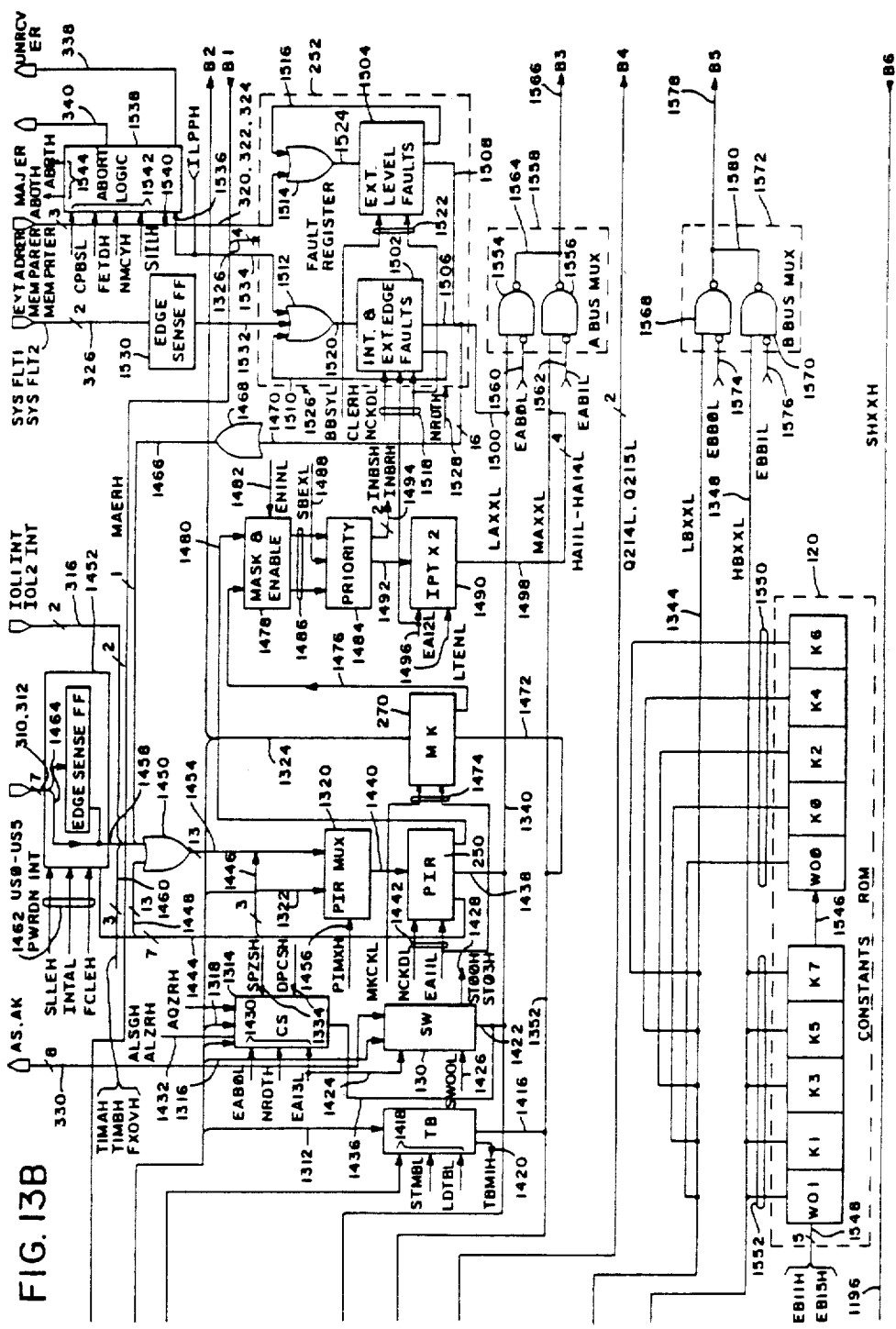

Outputs from the ALU 62 are also provided on lines 1168, from lines 924 and 926, through B1 (see also FIGS. 13A and 13B).

Additional inputs to the ALU 17th stage 1062 are the BES1H and BAL1H signals supplied by booth encoder on 1074 lines 1170 and 1172. The SR06L signal is also supplied to the ALU 17th stage 1062 from shifter decoder 1174, on lines 1176 and 1178. The SR06L signal is also supplied to booth encoder 1074 on line 1176. ALU 17th stage 1062 supplies the SHM1H and SHM2H signals on lines 1180. Shifter decoder 1174 receives the ABRTH and DVTRH input signals on lines 1182 and 1184, and an input on 1186 through C9 (see also FIGS. 11A and 11B). The shifter decoder 1174 supplies the SR01 through SR17, SR21H, SHFFH and SRM0H signals to shifter 1102 on lines 1188, 1190 and 1192. Additional signal outputs from the shifter decoder 1174 are shown to the right of that unit.

The SHXXH signals are supplied by shifter 1102 on lines 1196. Lines 1196 are connected through B6 to register file 82 (see also FIGS. 13A and 13B).

The AL00H signal is provided by line 926 and line 1198 from ALU 62 to quotient bit generator and carry logic 1132. The NCINH and NCMHX signals are supplied to generator and logic 1132 by lines 1200 and 1128 through C8 (see also FIGS. 11A and 11B). The CLDV, DIVCH, IFDVH, DVBTL, DOSGH, SSTKH, NCKDL, NRCKL signals are supplied to generator and logic 1132 on lines 1202. The SKFFH signal is supplied to generator and logic 1132 from sticky flipflop logic 1204 on line 1206. The FPASL signal is supplied to the generator and logic 1132 on line 1208 and to booth encoder 1074 on line 1210. The BOCYH and ADSBL signals are supplied by the booth encoder 1074 to the generator and logic 1132 on lines 1212 and 1214. The generator and carry logic 1132 provides the DAL1H signal to booth encoder 1074 on line 1216. The generator and logic 1132 provides the DVQBH signal on line 1218.

The Q214L and Q215L signals are supplied to the booth encoder 1074 on lines 1220 through B4 (see also FIGS. 13A and 13B). The NAL1H signal is provided to booth encoder 1074 from lines 1200 on line 1222. The FLT0H, FLT1H, BFLCH, EABOL, EA09L, EBB0L, EB09L and NCKDL signals are supplied to the booth encoder 1074 on lines 1224. The Q214L and Q215L signals are supplied to booth encoder 1074 on lines 1226. The SH14L and SH15L signals are supplied to booth encoder 1074 on lines 1228.

Details of the register file 82 and associated circuits are shown in FIGS. 13A and 13B. Registers R0 through R15 in the register file 82 receive the SHXXH signals from shifter 1102 (FIG. 12) through lines 1196. The A1, A2, Q1 and Q2 registers are also connected to receive the SHXXH signals by lines 1300, 1302, 1304 and 1306. The DO0, TA and TB registers also receive the SHXXH signals on lines 1308, 1310 and 1312. The status word register 130 and the CS register 1314 are respectively connected by lines 1316 and 1318 to receive 12 and 4 of the SHXXH signals. The pending interrupt register multiplexer 1320 and the mask register 270 are connected to receive the SHXXH signals by lines 1322 and 1324, respectively. The fault register 252 is connected to receive the SH00H through SH04H signals by lines 1326. These same signals are supplied through B2 to configuration register 1042 (FIG. 12).

The R0 through R15 registers in register file 82 receive the EA00L through EA07L and EB00L through EB07L signals on lines 1328, 1330, 1332 and 1334. Even numbered registers R0 through R14 receive the even numbered RC0L through RC14L signals on lines 1336. Odd numbered registers R1 through R15 receive the RC1L through RC15L signals on lines 1338. Even numbered registers R0 through R14 are connected to bus 1340 by lines 1342. The even numbered registers R0 through R14 are also connected to bus 1344 by lines 1346. Odd numbered registers R1 through R15 are connected to bus 1348 by lines 1350. The odd numbered registers R1 through R15 are also connected to bus 1352 by lines 1354.

The A1 register is connected to buses 1348 and 1352 by lines 1356 and 1358. The A1 register is also connected by line 1360 to supply the A1D1L, A1D2L and A1D3L signals to detection logic and sign flipflop 1362. The A1 register receives the EA08L, EB08L, A1C1L and CLRAH signals on lines 1364.

The A2 register is connected to the buses 1340 and 1344 by lines 1366 and 1368. The A2 register supplies the A2D1L, A2D2L and A2D3L signals to detection logic and sign flipflop 1362 on lines 1370. The A2 register receives the EA08L, EB08L, A2C1L, A2C2L, A2C3L, SR22L, A215L and CLRAH signals on lines 1372. The A2 register receives the AL14H and AL15H signals from ALU 62 through B1 and lines 1168 (see also FIG. 12). The A2 register also receives the Q100L signal from the Q1 register on line 1374.

The Q1 register is connected to bus 1348 by line 1376 and to bus 1352 by lines 1376 and to bus 1352 by lines 1378. The Q1 register supplies the Q1D1H and Q1D2L signals to detection logic and sign flipflop 1362 on lines 1380. The Q1 register supplies the Q114H and Q115H signal on lines 1382 to the Q2 register. The Q1 register receives the EA09L, EB09L, Q1C1L, Q1C2L, SQR2L, SQL1L, SR24L, SR25L and NSR2L signals on lines 1384. The Q1 register receives the Q200H signal on line 1386 from the Q2 register. The Q1 register receives the AL06H, AL07H, AL14H and AL15H signals from ALU 62 through B1 on four of the lines 1168 (see also FIG. 12).

The Q2 register is connected to bus 1340 by lines 1388 and to the bus 1344 by lines 1390. The Q2 register receives the SR23L, ALLDL, SQL1L, SQL2L, EA09L, EB09L, Q2C1L and Q2C2L signals on lines 1392. The Q2 register receives the AL14H and AL15H signals on lines 1394 and the DVQBH signal on line 1396. The DO0 register is connected to the bus 1340 by lines 1398 and to the bus 1344 by lines 1400. The DO0 register receives the EA10L, EB10L and DO0CL signals on lines 1402. It supplies the D0SGH signal on line 1404.

The DO1 register is connected to the bus 1348 by lines 1406 and to the bus 1352 by lines 1408. The DO1 register receives the EA10L, EB10L and DO1CL signals on lines 1410. The timer A (TA) register is connected to bus 1340 by lines 1412. The TA register receives the STMAL, EA14L and LDTAL signals on lines 1414. It supplies the TAM1H signal on line 1415. The timer B (TB) register is connected to bus 1352 by lines 1416. It receives the EA14L, STMBL and LDTBL signals on lines 1418 and supplies the TBM1H signal on line 1420. The status word (SW) register 130 is connected to bus 1340 by lines 1422. The SW register 130 receives the EA13L signal on line 1424 and the SW00L signal on line 1426. It supplies the ST00H through ST03H signals on lines 1428. The SW register 130 supplies the AS0 through AS3 and AK0 through AK3 signals on status bus 330 (see also FIG. 3). The CS register 1314 receives the EAB0L, NRDTH and EA13L signals on lines 1430 and the ASLGH and ALZRH signals on lines 1432. It also receives the SPZSH and DPCSH signals on lines 1434. Outputs from the CS register 1314 are supplied to bus 1340 by lines 1436. The pending interrupt register (PIR) 250 is connected to bus 1340 by lines 1438. The PIR 250 is connected to PIR multiplexer 1320 by lines 1440. The PIR 250 receives the NCKDL and EA11L signals on lines 1442. Outputs from the PIR 250 are supplied on lines 1444, 1446, and 1448 to PIR multiplexer 1320, or gate 1450 and edge sense flipflop 1452. The PIR multiplexer also receives the output of or gate 1450 on lines 1454 and the PIMXH signal on line 1456. Additional inputs to the or gate 1450 are supplied by the edge sense flipflop 1452 on lines 1458, the TIMAH, TIMBH and FXOVH signals on lines 1460 and the external IOL1 INT and IOL2 INT inputs on lines 316 (see also FIG. 3).

Additional inputs to the edge sense flipflop 1452 are provided by the SSLEH, INTAL and FCLEH signals on lines 1462. The external USR0 through USR5 and PWRDN INT signals are supplied to the edge sense flipflop 1452 on lines 310 and 312 (see also FIG. 3), and directly to or gate 1450 on lines 1464. The or gate 1450 also receives the MAERH signal on line 1466 from or gate 1468. Or gate 1468 is connected to fault register 252 by lines 1470.

Mask register (MK) 270 is connected to bus 1352 by lines 1472. MK 270 receives the MKCKL and EA11L signals on lines 1474. The MK 270 supplies inputs on lines 1476 to mask and enable circuit 1478. The mask and enable circuit 1478 also receives inputs from PIR 250 on lines 1480. The remaining input to mask and enable circuit 1478 is the EN1HL signal on line 1482. The outputs of mask and enable circuit 1478 are supplied to priority circuit 1484 by lines 1486. The remaining input to priority circuit 1484 is the SBEXL signal on line 1488. Outputs from the priority circuit 1484 are supplied to the IPTX2 register 1490 on lines 1492. Priority circuit 1484 also supplies the INBSH and INBRH signals on lihes 1494. The remaining inputs to the IPTX2 register are the EA12L and LTENL signals on lines 1496. The output of IPTX2 register 1490 is the HA11L through HA14L signals supplied on lines 1498 to bus 1352.

Fault register 252 is connected by lines 1500 to bus 1340. Internal and external edge faults circuit 1502 and external level faults circuit 1504 of fault register 252 are connected to lines 1500 by lines 1506 and 1508, respectively. Outputs of the internal and external edge fault circuit 1502 are also connected by lines 1510 to or gate 1512. Outputs of the external level fault circuit 1504 are connected to or gate 1514 by lines 1516. Inputs to the internal and external edge fault circuit 1502 are provided by the NCKDL, EA12L and EAB0L signals on lines 1518, and by the output of flipflop 1512 on line 1520. Inputs to the external level fault circuit 1504 are provided by the BBSYL and EAB0L signals on lines 1522 and by the output of or gate 1514 on lines 1524. The CLERH and NRDTH signals are supplied to fault register 252 on lines 1526 and 1528. The output of edge sense flipflop circuit 1530 is supplied on lines 1532 to or gate 1512. The remaining signal to or gate 1512 is the ILPPH signal on line 1534, which is also supplied on line 1536 to abort logic 1538. The inputs to edge sense flipflop circuit 1530 are the SYSFLT1 and SYSFLT0 external signals supplied on lines 326 (see also FIG. 3). The externally supplied EXT ADR ER, MEM PAR ER and MEM PRT ER signals are supplied on lines 320, 322 and 324 to or gate 1514. They are also supplied on lines 1540 to abort logic 1538. The CPBSL, FETDH, NMCYH and S1ILH signals are supplied to abort logic 1538 on lines 1542. Abort logic 1538 provides the external MAJ ER and UNRCV ER signals on lines 340 and 338, respectively (see also FIG. 3). Abort logic 1538 also provides the ABOTH and ABRTH signals on lines 1544.

Constants ROM 120 includes the W00, W01, and K0-K7 circuits. The K7 circuit is connected to the W00 circuit by lines 1546. The EB11H through EB15H signals are supplied to the constants ROM 120 on lines 1548. The W00, K0, K2, K4 and K6 circuits of contants RQM 120 are connected to bus 1344 by lines 1550. The W01, K1, K3, K5 and K7 circuits are connected to bus 1348 by lines 1552.

Buses 1340 and 1352 are respectively connected to nand gates 1554 and 1556 in A bus multiplexer 1558. The other inputs to nand gates 1554 and 1556 are the EAB0L and EAB1L signals on lines 1560 and 1562, respectively. The outputs of nand gates 1554 and 1556 are supplied on lines 1564 and 1566 through B3 (see also FIG. 12).

Buses 1344 and 1348 are respectively connected as inputs to nand gates 1568 and 1570 in B bus multiplexer 1572. The other inputs to nand gates 1568 and 1570 are supplied by the EBB0L and EBB1L signals on lines 1574 and 1576, respectively. The outputs of nand gates 1568 and 1570 are supplied on lines 1578 and 1580 through B5 (see also FIG. 12).

Figure 14:
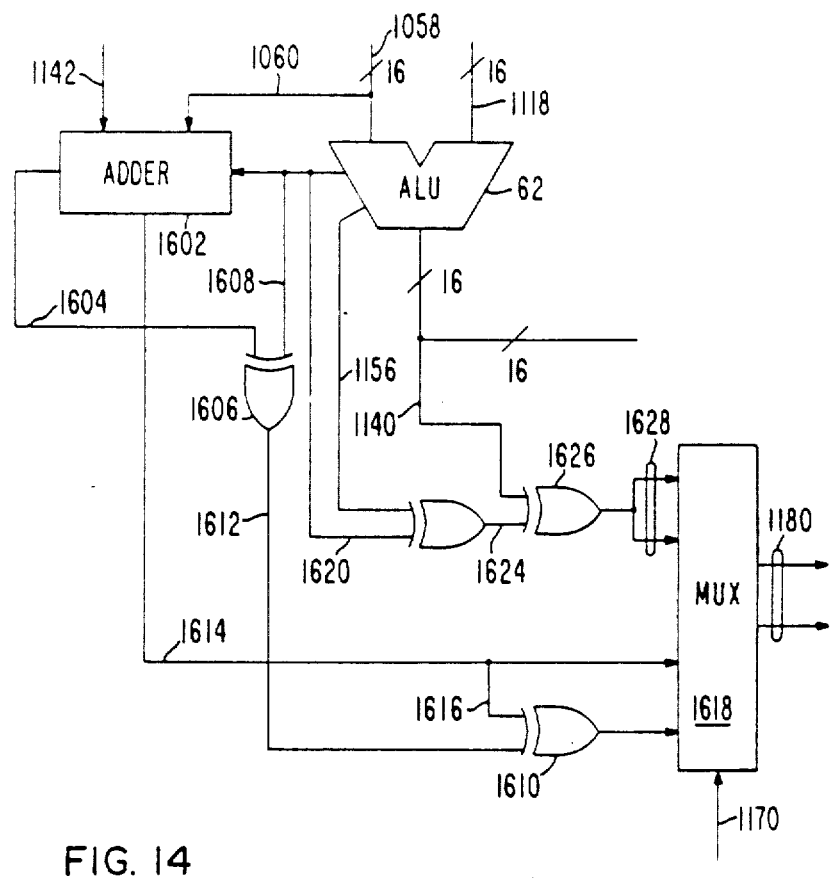
FIG. 14 is a circuit diagram of a portion of the block diagram of FIG. 12.

Details of the circuits for overflow handling in execution of the modified Booth multiplication algorithm are shown in FIG. 14. ALU 62 is connected to overflow circuits 1600 forming a part of the ALU 17th stage 1062 and overflow logic 1152 (FIG. 12). Adder 1602 receives the BX00L signal from shifter 1066 (FIG. 12) and the AX00L signal from ALU 62 on line 1060. The remaining input to adder 1602 is the ALCOL signal on line 1144. Adder 1602 provides a CO signal on line 1604 as one input to exclusive OR gate 1606. The other input to gate 1606 is the ALCOL signal on line 1608. The output of gate 1606 is provided as one input to exclusive OR gate 1610 on line 1612. The other input to exclusive OR gate 1610 is provided by adder 1602 on lines 1614 and 1616, which is also supplied to multiplexer 1618.

The ALCOL signal is also supplied on line 1620 as one input to exclusive OR gate 1622. The other input to gate 1622 is the ALC0H signal on line 1156. The output from gate 1622 is supplied on line 1624 as one input to exclusive OR gate 1626. The other input to gate 1626 is the AL00L signal on line 1140. The output of gate 1626 is supplied on lines 1628 as inputs to the multiplexer 1618. The other input to multiplexer 1618 is the BES1H signal on line 1170. The output of multiplexer 1618 is the SHM1H and SHM2H signals on lines 1180

Figure 15:
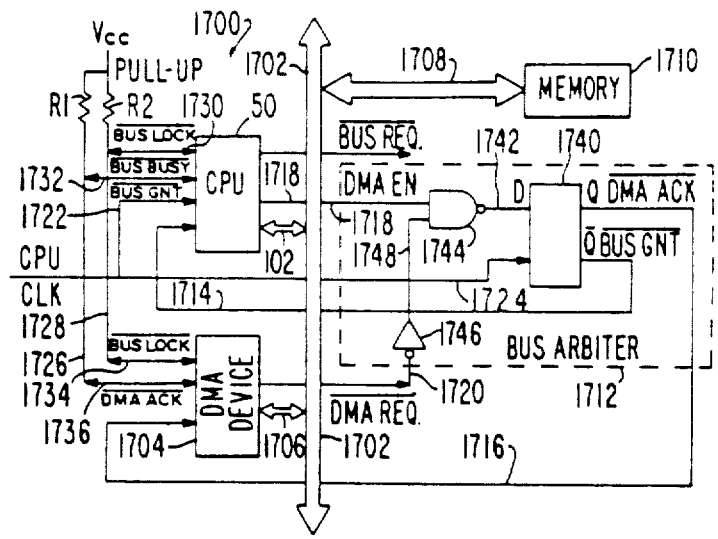
FIG. 15 is a block diagram of another system incorporating a microprocessor in accordance with the invention.

FIG. 15 shows a system 1700 incorporating a microprocessor 50 as described above in a multiprocessing environment. The microprocessor 50 is connected to an external bus 1702 by information bus 102 (see also FIGS. 1A and 1B). A DMA device 1704 is also connected by bus 1706 to the bus 1702. Bus 1708 connects the bus 1702 to memory 1710, which may be, for example, a random access memory. A bus arbiter 1712 is connected to the DMA device 1704 by line 1716. The microprocessor 50 is also connected to the bus arbiter 1712 by line 1718, and the DMA device 1704 is also connected to the bus arbiter 1712 by line 1720.

A CPU CLK clocking signal is supplied to the microprocessor 50 and the bus arbiter 1712 on lines 1722 and 1724, so that those two units operate synchronously. The DMA device 1704 operates asynchronously relative to the microprocessor 50 and the bus arbiter 1712. Lines 1726 and 1728 are connected by lines 1730 and 1732 to the microprocessor, and by lines 1734 and 1736, to the DMA device 1704. The lines 1726 and 1728 are connected by pull-up resistors R1 and R2 to a source of Vcc potential.

The bus arbiter 1712 includes a D flip-flop 1740. The Q output of flip-flop 1740 is connected to line 1716 to supply a $\overline{\text{DMA ACK}}$ signal to DMA device 1704. The $\overline{\text{Q}}$ output of the flip-flop 1740 is connected to line 1714 to supply a $\overline{\text{BUS GNT}}$ signal to microprocessor 50. D input to flip-flop 1740 is connected by line 1742 to output of NAND gate 1744. One input to NAND gate 1744 is provided by a DMA EN signal from microprocessor 50 on line 1718. The other input to NAND gate 1744 is provided by output of inverter 1746 on line 1748. The input to inverter 1746 is a $\overline{\text{DMA REQ}}$ signal from DMA device 1704 on line 1720. The $\overline{\text{BUS REQ}}$ output of microprocessor 50 at 1721 is unconnected, because the bus 1702 is automatically assigned to microprocessor 50 if there is no request by the higher priority DMA device 1704 in this system.

FIG. 9 is useful for explaining operation of the system 1700. If no $\overline{\text{DMA REQ}}$ signal is present on line 1720, the bus arbiter 1712 supplies $\overline{\text{BUS GNT}}$ signal on line 1714. However, if a $\overline{\text{DMA REQ}}$ signal is present on line 1720, the bus arbiter will respond with a $\overline{\text{DMA ACK}}$ signal on line 1716 to DMA device 1704. In that case, the microprocessor will wait until it receives a signal. When the microprocessor 50 or the DMA device accesses bus 1702 after a $\overline{\text{BUS GNT}}$ or a $\overline{\text{DMA ACK}}$ signal, the accessing unit supplies a $\overline{\text{BUS LOCK}}$ signal on line 1730 or 1734 to lock the non-accessing unit from the bus 1702. The presence of a $\overline{\text{BUS LOCK}}$ signal from the accessing unit on line 1728 will prevent the other unit from accessing the bus 1702 until the $\overline{\text{BUS LOCK}}$ signal is removed. The $\overline{\text{BUS BUSY}}$ signal operates in a similar manner to $\overline{\text{BUS LOCK}}$, except that it will allow faults to be clocked in to the system. For certain types of operations, the microprocessor 50 will keep the $\overline{\text{BUS LOCK}}$ signal low even when it is not actually using the bus 1702 during the cycle, so that it will not be necessary for the microprocessor 50 to bid for the bus 1702 at the end of such cycles.

Figure 16:
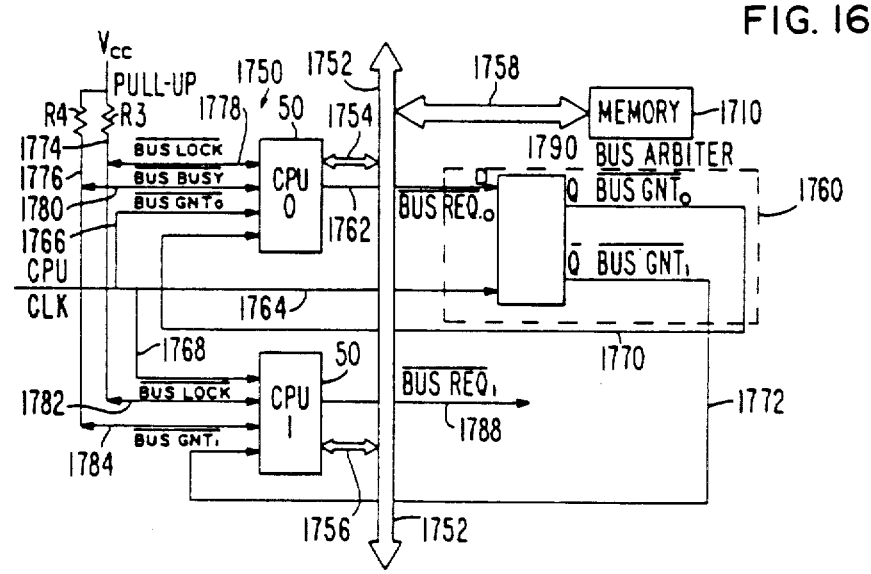
FIG. 16 is a block diagram of another system incorporating a microprocessor in accordance with the invention.

FIG. 16 shows another system 1750 incorporating two microprocessors 50 in accordance with the invention. Each of the microprocessors 50 are connected to a bus 1752 by buses 1754 and 1756, respectively. Bus 1752 is connected by bus 1758 to memory 1710. CPU 0 microprocessor 50 is connected to bus arbiter 1760 by line 1762. Lines 1764, 1766, and 1768 supply a CPU CLK signal to the bus arbiter 1760, the CPU 0 microprocessor 50 and the CPU 1 microprocessor 50, respectively. The bus arbiter 1760 is connected to the CPU 0 and CPU 1 microprocessors 50 by lines 1770 and 1772, respectively. The CPU 0 microprocessor is connected to lines 1774 and 1776 by lines 1778 and 1780, respectively. The CPU 1 microprocessor 50 is connected to the lines 1774 and 1776 by lines 1782 and 1784. Lines 1774 and 1776 are connected to a source of Vcc potential through resistors R3 and R4. The $\overline{\text{BUS REQ1}}$ output of the CPU 1 microprocessor 50 on line 1788 remains unconnected, since the bus arbiter 1760 will provide a $\overline{\text{-BUS GNT1}}$ signal on line 1772 to CPU 1 microprocessor 50 in the absence of a $\overline{\text{BUS REQ0}}$ signal on line 1762 from the CPU 0 microprocessor 50. The bus arbiter 1760 consists of a D flip-flop 1790. The Q output of flip-flop 1790 is connected to line 1770. The $\overline{\text{Q}}$ output of the flip-flop 1790 is connected to line 1772.

In operation, when CPU 0 microprocessor 50 needs to access bus 1752, it supplies the $\overline{\text{BUS REQ}}$ signal to bus arbiter 1760 on line 1762. In response, to this signal, the bus arbiter supplies the $\overline{\text{BUS GNT0}}$ signal on line 1770. CPU 0 microprocessor 50 then samples line 1774 for the presence of a $\overline{\text{BUS LOCK}}$ signal. If this signal is not present the CPU 0 microprocessor 50 accesses the bus 1752 and supplies a $\overline{\text{BUS LOCK}}$ and a $\overline{\text{BUS BUSY}}$ signal on line 1778 or 1780 to lock the CPU 1 from the bus 1752 during a cycle in which CPU 0 microprocessor 50 is accessing the bus 1752. CPU 0 microprocessor 50 terminates the $\overline{\text{BUS REQ0}}$ signal when it accesses the bus 1752. In the absence of a $\overline{\text{BUS REQ0}}$ signal on line 1762, the bus arbiter 1760 supplies the $\overline{\text{BUS GNT1}}$ signal to CPU 1 microprocessor 50, the CPU 1 microprocessor 50 for the presence of the $\overline{\text{BUS LOCK}}$ signal on line 1774, accesses and locks the bus 1752 in the same manner as the CPU 0 microprocessor 50.

Figure 17:
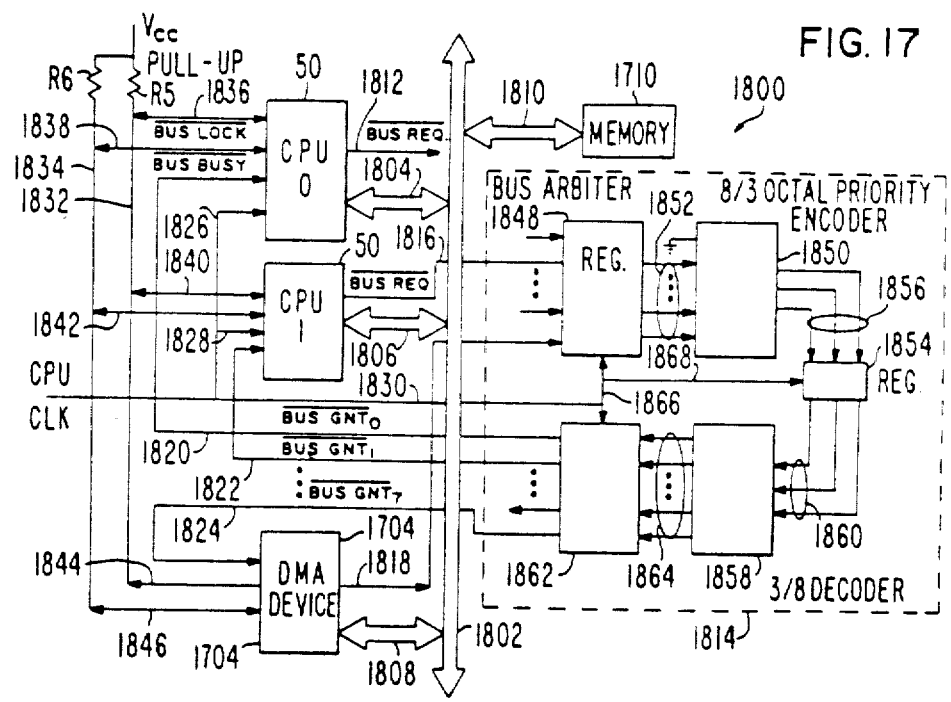
FIG. 17 is a block diagram of another system incorporating a microprocessor in accordance with the invention.

A system 1800 incorporating a plurality of the microprocessors 50 and a DMA device 1704 is shown in FIG. 17. The microprocessors 50 and the DMA device 1704 are connected to bus 1802 by buses 1804, 1806, and 1808. The bus 1802 is connected to memory 1710 by bus 1810. $\overline{\text{BUS REQ}}$ output line 1812 from CPU 0 microprocessor 50 is not connected to bus arbiter 1814, and that microprocessor is assigned access to the bus 1802 in the absence of a $\overline{\text{BUS REQ}}$ signal from any other microprocessor 50 or a $\overline{\text{DMA REQ}}$ signal from DMA device 1704. The CPU 1 microprocessor 50 is connected to bus arbiter 1814 by line 1816. Up to six additional microprocessors 50 may be connected to the bus arbiter 1814 in the same manner. The DMA device 1704 is connected to the bus arbiter 1814 by line 1818. The CPU 0 and CPU 1 microprocessors 50 and the DMA device 1704 are connected to the bus arbiter 1814 by lines 1820, 1822 and 1824 to receive the $\overline{\text{BUS GNT0}}$, $\overline{\text{BUS GNT1}}$ and $\overline{\text{BUS GNT7}}$ signals, respectively. The microprocessors 50 and the bus arbiter 1814 receive the CPU CLK signals on lines 1826, 1828 and 1830 for synchronous operation. The DMA device 1704 operates asynchronously. The microprocesors 50 and the DMA device 1704 are connected to lines 1832 and 1834 by lines 1836, 1838, 1840, 1842, 1844 and 1846. The lines 1832 and 1834 are connected to a source of Vcc potential through resistors R5 and R6. The bus arbiter 1814 includes a register 1848 connected to an 8/3 octal priority encoder 1850 by lines 1852. The encoder 1850 is connected to a register 1854 by lines 1856. The register 1854 is connected to a $\frac{3}{8}$ decoder 1858 by lines 1860. The decoder 1858 is connected to a register 1862 by lines 1864.

In operation of the system 1800, $\overline{\text{BUS REQ}}$ and $\overline{\text{DMA REQ}}$ inputs to the bus arbiter 1814 are supplied to register 1848 from the microprocessors 50 and the DMA device 1704. Register 1862 supplies the $\overline{\text{GUS GNT}}$ signals to the microprocessors 50 and the DMA device 1704. Registers 1848, 1854 and 1862 receive the CPU CLK signals on lines 1866 and 1868. The microprocessors 50 and DMA device 1704 access and lock the bus 1802 in the same manner as in the FIGS. 15 and 16 systems, with the CPU 0 microprocessor 50 receiving the $\overline{\text{BUS GNT0}}$ signal in the absence of any other requesting bus master microprocessor 50 or DMA device 1704, and the DMA device 1704 having the highest priority in the case of competing requests for the bus 1802.

Because the DMA device 1704 is not synchronous with the microprocessors 50 and since the $\overline{\text{DMA REQ}}$ is the highest priority bus request, the acknowledged DMA device 1704 must either keep its $\overline{\text{DMA REQ}}$ active as long as it is using the bus 1802, or once having acquired the bus, assert $\overline{\text{BUS LOCK}}$ before relinquishing $\overline{\text{DMA REQ}}$.

Figure 11B:
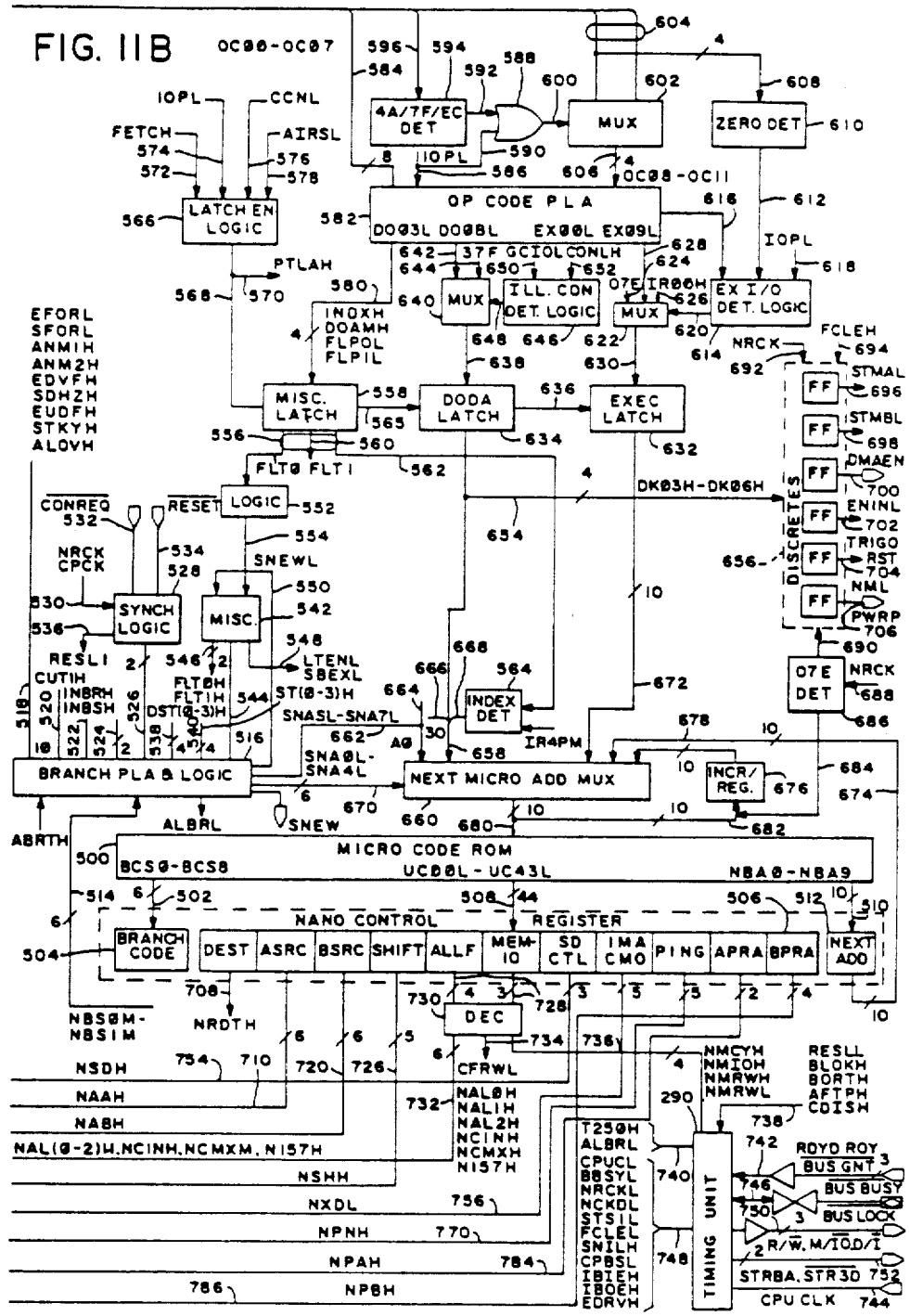
Figure 19:
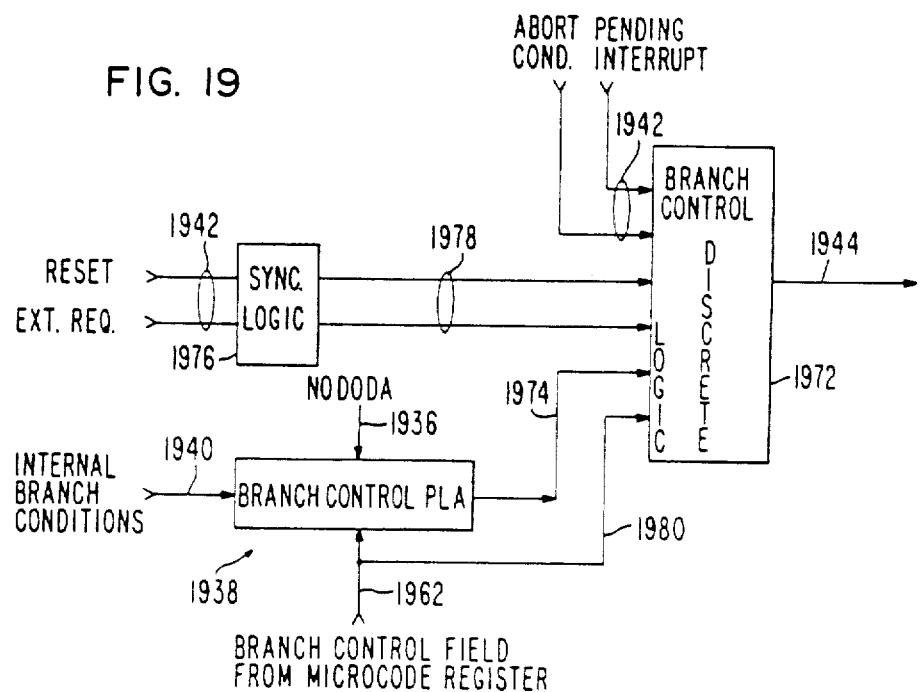
FIG. 19 is a more detailed block diagram of the system portion shown in FIG. 18.

Further details of the branch PLA implementation shown in FIG. 11B are shown in FIGS. 18 and 19. A 2:1 multiplexer 1900 receives inputs at 1902 and 1904 respectively, from a system memory and from a data section of the microprocessor. The multiplexer 1900 provides inputs on lines 1906 to instruction register 1908. The instruction register 1908 provides inputs to op code/I0/console decode PLA 1910 on lines 1912, and to source/destination latch 1914 on lines 1916. Latch 1914 is connected to source/destination up-/down counter 1918 by lines 1920. Counter 1918 provides outputs on lines 1921 to the data section of the microprocessor. PLA 1910 provides outputs on lines 1922 and 1924 to a derived operand derived address (DODA) microroutine address latch 1926 and an execution microroutine address latch 1928. The DODA and execution latches are connected by lines 1930 and 1932 to provide inputs to a next microcode address multiplexer 1934. PLA 1910 is connected to supply specific branch conditions inputs on lines 1936 to branch control logic 1938. The branch control logic 1938 also receives internal and external branch conditions inputs on lines 1940 and 1942, respectively. Branch control logic 1938 provides outputs on lines 1944, five of which are directly supplied to multiplexer 1934, and three of which are combined with seven constants inputs on lines 1946 for supply to the multiplexer 1934. Outputs of the multiplexer 1934 are supplied on lines 1948 to a microcode storage ROM 1950, and on lines 1952 to an incrementer 1954. The output of incrementer 1954 is supplied on lines 1956 as an input to the multiplexer 1934. Microcode outputs from the ROM 1950 are supplied on lines 1958 as an input to microcode register 1960. Branch control information inputs are supplied by the microcode register 1960 to the branch control logic 1938 on lines 1962. Control fields outputs are supplied by the microcode register 1960 on lines 1964. Address inputs are supplied by the microcode register 1960 to multiplexer 1934 on lines 1966.

Further details of the branch control logic 1938 are shown in FIG. 19. The branch control logic 1938 includes a branch control PLA 1970 and branch control discrete logic 1972, connected to the PLA 1970 by lines 1974. The internal branch conditions generated by the microprocessor are supplied to the PLA on lines 1940. Abort condition and pending interrupt external branch conditions are supplied directly on lines 1942 to logic 1972. Reset and external request external branch conditions are supplied on lines 1942 through synchronization logic 1976 and lines 1978 to logic 1972. The branch conditions inputs on lines 1936 to PLA 1970 from PLA 1910 (FIG. 18) identify when derived operand derived address inputs are not being supplied to latch 1926. The branch control field inputs from register 1960 on lines 1962 are supplied to the PLA 1970 and, on lines 1980, to logic 1972. The outputs from logic 1972 on lines 1944 control the next micro address multiplexer 1934.

The branch control discrete logic 1972 determines the source of the next microaddress and samples the four external branch conditions inputs on lines 1942. The next microaddress is selected from the DODA pointer, execution pointer, branch address, next sequential address, or the miscellaneous pointer. The miscellaneous pointer includes interrupt service routines, console routines, filling the pipeline, abort routines and reset routines. The branch control logic 1938 provides two way branching capability between a next sequential address and a branch address, a next sequential address and exit, and a branch address and exit. The exit choice includes selection of DODA, execution, interrupt pointer and console pointer. A system reset overrides all other branch conditions. An abort condition overrides all other branch conditions except reset.

The microprocessor 50 of this invention is preferably fabricated as a single integrated circuit in 13L-11 3-micron (second generation) high performance bipolar technology. This technology incorporates a minimum gate delay of 2.5 nanoseconds, a packing density of 535 gates/square millimeter of integrated circuit area, including power buses, routing wire overhead, and 1200 gates/square millimeter intrinsic density.

It should now be readily apparent to those skilled in the art that a microprocessor and microprocessor system capable of achieving the stated objects of the invention has been provided. The microprocessor of this invention handles interrupts and faults in a comprehensive manner. The handshaking protocol of this microprocessor system handles both synchronous and asynchronous operation with a reduced switching time between master processors. The microprocessor carries out both arithmetic and floating point operations with the same type of microcode and with sharing of common microcode instructions for different floating point operations efficiently. A dedicated pinout for interrupt acknowledge signals is not required, and interrupt linkage pointers are generated more efficiently. Comprehensive branch control is provided.

It should further be apparent to those skilled in the art that various changes in form and details of the invention as shown and described may be made. It is intended that such changes be included within the spirit and scope of the claims appended hereto.

What is claimed is:

1. A microprocessor including a pipelined path for flow of instructions in said microprocessor, which comprises a microcode address multiplexer connected to supply addresses from a plurality of different inputs to a microcode storage means, said microcode storage means being connected to supply microcode, in response to the addresses to a microcode register, said microcode register being connected to supply branch control information to a branch control means, said branch control means being connected to receive branch condition inputs externally of said microprocessor, internally of said microprocessor and from a microcode address programmable logic array, said microcode address programmable logic array being connected to supply microcode addresses to said microcode address multiplexer, said branch control means being connected to control operation of said microcode address multiplexer.

2. The microprocessor of claim 1 in which said microcode programmable logic array is connected to supply microcode addresses to said microcode address multiplexer through a derived operand derived address microroutine address latch and an execution microroutine address latch and the branch condition input to said branch control means identifies which of said latches supplies an address to said microcode address multiplexer.

3. The microprocessor of claim 1 in which said microcode register is connected to supply an address portion of microcode as an input to said microcode address multiplexer.

4. The microprocessor of claim 1 in which said microcode address multiplexer is connected to supply addresses to an incrementer, and said incrementer is connected to supply address inputs to said microcode address multiplexer.

5. The microprocessor of claim 1 in which said branch control means and means for supplying a constant address portion supply address inputs to said microcode address inputs to said microcode address multiplexer.

6. The microprocessor of claim 1 additionally comprising an instruction register connected to supply instructions to said microcode address programmable logic array.

7. The microprocessor of claim 1 in which said branch control means comprises a branch control programmable logic array connected to supply branch control addresses to branch control discrete logic, said microcode register being connected to supply the branch control information both to said branch control programmable logic array and to said branch control discrete logic.

8. The microprocessor of claim 7 in which the branch condition inputs from said microcode address programmable logic array are supplied to said branch control programmable logic array.

9. The microprocessor of claim 8 in which the external branch condition inputs are supplied to said branch control discrete logic.

10. The microprocessor integrated circuit of claim 9 in which the internal branch condition inputs are supplied to said branch control programmable logic array.

* * * * *